United States Patent
Walsh et al.

(10) Patent No.: US 12,023,714 B2
(45) Date of Patent: Jul. 2, 2024

(54) DOCUMENT IMAGING SYSTEM AND METHOD FOR IMAGING DOCUMENTS TO CONVEY DOCUMENTS WITHOUT ENTRAINING DOCUMENTS

(71) Applicant: Opex Corporation, Moorestown, NJ (US)

(72) Inventors: James Walsh, Moorestown, NJ (US); Peter Patrick, Moorestown, NJ (US)

(73) Assignee: OPEX Corporation, Moorestown, NJ (US)

( * ) Notice: Subject to any disclaimer, the term of this patent is extended or adjusted under 35 U.S.C. 154(b) by 336 days.

(21) Appl. No.: 17/607,546

(22) PCT Filed: May 1, 2020

(86) PCT No.: PCT/US2020/031072
§ 371 (c)(1),
(2) Date: Oct. 29, 2021

(87) PCT Pub. No.: WO2020/227113
PCT Pub. Date: Nov. 12, 2020

(65) Prior Publication Data
US 2022/0219203 A1    Jul. 14, 2022

Related U.S. Application Data

(60) Provisional application No. 62/842,842, filed on May 3, 2019.

(51) Int. Cl.
*B07C 3/14* (2006.01)
*B41J 25/308* (2006.01)
(Continued)

(52) U.S. Cl.
CPC ............ *B07C 3/14* (2013.01); *B41J 25/3086* (2013.01); *G06V 30/127* (2022.01);
(Continued)

(58) Field of Classification Search
CPC .... G06V 30/127; G06V 30/224; G06V 30/10; B41J 25/3085; H04N 1/00602; H04N 1/00633; H04N 1/00716
(Continued)

(56) References Cited

U.S. PATENT DOCUMENTS

| 3,815,248 A | 6/1974 | Kulig |
| 4,073,391 A | 2/1978 | O'Brien |

(Continued)

OTHER PUBLICATIONS

International Search Report for PCT/US2020/031072 dated Jul. 15, 2020.

*Primary Examiner* — Gabriel I Garcia
(74) *Attorney, Agent, or Firm* — Brian Dinicola

(57) ABSTRACT

A system is provided for processing documents. In particular, the system incorporates a feeder for feeding documents to a device for further processing of the documents. For instance, the system finds particular application in the field of document imaging in which a variety of documents of varying sizes and orientation are to be fed to an imaging system, such as a document scanner. The system may provide a sorting station that receives documents from a workstation and sorts the documents to a plurality of sort locations. The system may export the image data for the documents to a fileserver so that a remote operator can provide instructions for the processing of the documents so that the documents can be subsequently processed according to the instructions provided by the operator.

6 Claims, 16 Drawing Sheets

(51) Int. Cl.
*G06V 30/12* (2022.01)
*G06V 30/224* (2022.01)
*H04N 1/00* (2006.01)
*G06V 30/10* (2022.01)

(52) U.S. Cl.
CPC ....... *G06V 30/224* (2022.01); *H04N 1/00602* (2013.01); *H04N 1/00633* (2013.01); *H04N 1/00716* (2013.01); *G06V 30/10* (2022.01)

(58) Field of Classification Search
USPC ........................................................ 382/101
See application file for complete search history.

(56) References Cited

U.S. PATENT DOCUMENTS

| | | | |
|---|---|---|---|
| 5,062,014 A * | 10/1991 | Yoshimura | G11B 15/29 |
| 5,084,922 A | 2/1992 | Louit | |
| 5,273,516 A | 12/1993 | Crowley | |
| 5,509,159 A | 4/1996 | Du-Bois | |
| 5,648,811 A | 7/1997 | Thiel et al. | |
| 6,070,899 A | 5/2000 | Gines | |
| 6,550,764 B2 | 4/2003 | Wilson et al. | |
| 7,308,858 B2 | 12/2007 | Lo | |
| 7,988,120 B2 | 8/2011 | Hsu | |
| 8,459,632 B2 | 6/2013 | DeWitt et al. | |
| 8,793,196 B2 | 7/2014 | Parkos et al. | |
| 8,939,274 B1 | 1/2015 | Ross, Jr. | |
| 9,849,582 B2 | 12/2017 | Cheff | |
| 2005/0018214 A1 * | 1/2005 | DeWitt | B07C 3/00 |
| | | | 382/101 |
| 2007/0110277 A1 * | 5/2007 | Hayduchok | G06V 30/2253 |
| | | | 382/101 |
| 2007/0127090 A1 | 6/2007 | Nonaka | |
| 2010/0095822 A1 * | 4/2010 | Fournier | B43M 7/005 |
| | | | 83/446 |
| 2014/0110313 A1 | 4/2014 | Bowes | |
| 2018/0154661 A1 * | 6/2018 | Tokai | B41J 11/64 |
| 2019/0268479 A1 * | 8/2019 | Montgomery | H04N 1/17 |
| 2020/0108418 A1 | 4/2020 | Richard | |

* cited by examiner

DOCUMENT IMAGING SYSTEM AND METHOD FOR IMAGING DOCUMENTS TO CONVEY DOCUMENTS WITHOUT ENTRAINING DOCUMENTS

RELATED APPLICATIONS

This application is related to U.S. patent application Ser. No. 16/285,075 filed Feb. 25, 2019, which claims priority to U.S. Provisional Patent Application No. 62/634,723 filed on Feb. 23, 2018. This application also claims priority to U.S. Provisional Patent Application No. 62/842,842 filed on May 3, 2019. The entire disclosure of each of the foregoing applications is hereby incorporated herein by reference.

FIELD OF THE INVENTION

The present invention relates to the field of document processing. In particular, the present application relates to processing documents to feeding documents to a device for further processing of the documents. The present invention finds particular application to the field of document imaging in which documents are to be fed to an imaging system, such as a document scanner.

BACKGROUND

Automated and semi-automated machines have been employed for processing documents. There have been numerous improvements in the field of document processing, including scanning and sorting documents, such as incoming mail. However, there remains a dsire to improve the handling and processing of documents.

SUMMARY OF THE INVENTION

The present system provides a number of improvements in the fields of document processing, including separate inventions in document handling, document scanning, and processing incoming mail. Although each of these improvements are combined into a single system, each of the improvements may be used as a separate invention in a document processing system.

For instance, according to a first aspect, a system is provided having a scanner for scanning documents, such as incoming envelopes, to obtain image data for the scanned documents. The image data may then be exported to await instructions from a separate user to provide instructions for how the documents are to be processed further. The system further includes a separate scanning element for detecting a marking or other identifying indicia on the documents for identifying the documents during a subsequent scan after the instructions have been received so that the instructions can be correlated with the document so that the document can be processed in accordance with the instructions.

According to another aspect, the system provides a system for processing documents that includes a conveyor for receiving documents, a plurality of output locations configured to receive documents from the conveyor and a sorter for sorting documents to the output locations. Optionally, the conveyor may be configured to convey documents along a document path without entraining the documents. Optionally, the sorter includes a first set of ejectors for displacing the documents transverse the document path. The sorter may optionally include a displaceable stop operable to selectively stop documents along the document path. Additionally, the sorter may optionally include a pair of rotatable cams and a pair of rotatable cam followers connected with one or more of the first set of ejectors and the stop to selectively control the ejector and the stop. Optionally, the sorter may include a shaft connected with the first and second cams such that rotation of the shaft by a first angular amount raises the stop without raising the ejector and wherein rotation of the shaft by a second amount raises the ejector.

According to another aspect, the present invention provides a document processing apparatus having a first conveyor having a first adjustment mechanism. The apparatus also includes a second conveyor operably connected with the first conveyor so that documents discharged from the first conveyor are fed onto the second conveyor without manual intervention. The system further includes a sensor for detecting a characteristic of the first conveyor that is indicative of the height of the first conveyor. The second conveyor includes a second adjustment mechanism for adjusting the height of the second conveyor, wherein the second adjustment mechanism automatically adjusts the height of the second conveyor in response to signals received from the sensor.

According to a further aspect, the present invention provides an apparatus for processing documents that includes a scanner, a conveyor and a printer assembly. The printer assembly is configured to maintain the print head in operative engagement with the documents while documents of varying thickness pass by the printer assembly. Optionally, the printer is an ink jet printer having a print head and a linkage interconnects the print head with a follower positioned adjacent the conveyor. The documents may pass between the conveyor and the follower so that the follower is vertically displaceable in response to changes in thickness of documents. Optionally, the linkage transfers vertical displacement of the follower to vertical displacement of the print head.

According to yet another aspect, the present invention provides a document receptacle configured to accept a variety of documents and to minimize overlapping documents that can lead to documents jamming. In particular, the receptacle may be configured to receive documents being conveyed in a generally horizontal orientation. Optionally, the receptacle has a first edge adjacent a paper path, such as a conveyor and a second edge opposing the first edge and spaced apart from the first edge. A substantially horizontal land in disposed between the first edge and the second edge. A first bottom surface extends downwardly from a first end of the horizontal land toward the first edge so that the first bottom surface forms an angle with the horizontal land. A second bottom surface extends downwardly from a second end of the horizontal land projecting toward the second edge so that the second bottom surface forms an angle with the horizontal land. Optionally, the receptacle includes a wall at the second edge and the second bottom surface intersects the wall to form a pocket, such as a v-shaped pocket. Optionally, the first bottom surface forms a ramp guiding documents to a bin or other container for receiving documents.

While the methods and apparatus are described herein by way of example for several embodiments and illustrative drawings, those skilled in the art will recognize that the inventive methods and apparatus for sorting items using a dynamically reconfigurable sorting array are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the methods and apparatus for sorting items using one or more dynamically reconfigurable sorting array defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Some portions of the detailed description which follow are presented in terms of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
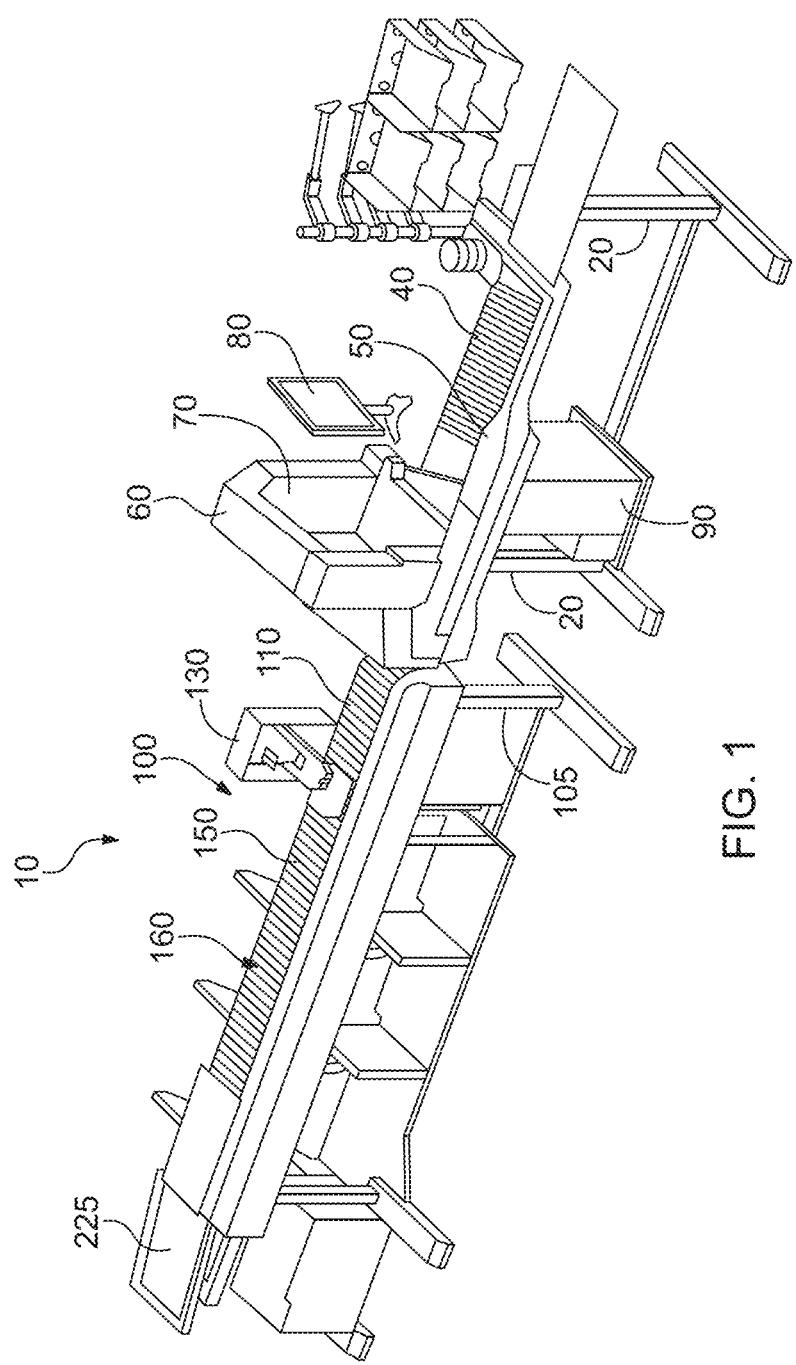
FIG. 1 is a perspective view of a system for processing documents.
Figure 2:
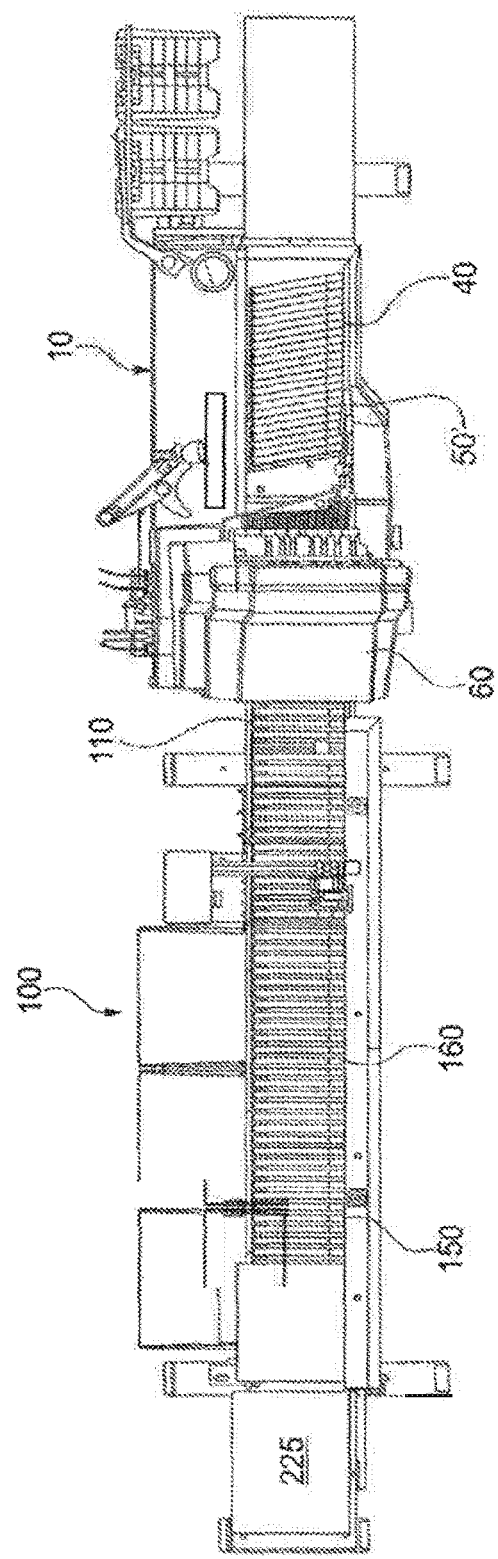
FIG. 2 is a plan view of the system illustrated in FIG. 1.

Referring now to the figures in general and to FIGS. 1 and 2 in particular, a system is illustrated, which includes a document scanning workstation 10 and sorting station 110. The system is configured to process a variety of documents, including mail. In particular, the system has the capability of processing a variety of different sized documents. The system may selectively scan and sort the documents depending on a variety of criteria. Additionally, the system may include elements for facilitating the processing of mail, such as by opening envelopes and facilitating the extraction of documents from with the envelopes. In particular, the system may be configured in a variety of configurations that may or may not include elements designed to facilitate extraction of documents from envelopes.

Referring to a first embodiment illustrated in FIG. 1, the workstation 10 is configured to facilitate the processing of documents in the form of envelopes containing items. The system is also able to process documents that have been extracted from envelopes or any other type of document. Accordingly, in the following discussion, when used throughout the description and the claims, unless otherwise noted, the term document may refer to any type of written or printed matter and may include envelopes and other mail pieces.

The workstation 10 includes a scanner 60 for scanning the documents to obtain image data for the documents. Additionally, the workstation may include any of a variety of feed mechanisms for feeding documents to the scanner. In the exemplary embodiment illustrated in FIGS. 1-3, the system may include a horizontal drop conveyor 40 configured to receive documents in a substantially flat or horizontal orientation. The drop conveyor 40 conveys the documents to a feeder 50. The feeder is configured to serially feed the documents to the scanner 60. The feeder 50 is preferably configured to accommodate a packet of documents so that the feeder can receive the packet from the drop conveyor 40 and then singulate the packet of documents so that the documents are serially fed to the scanner 60.

Figure 3:
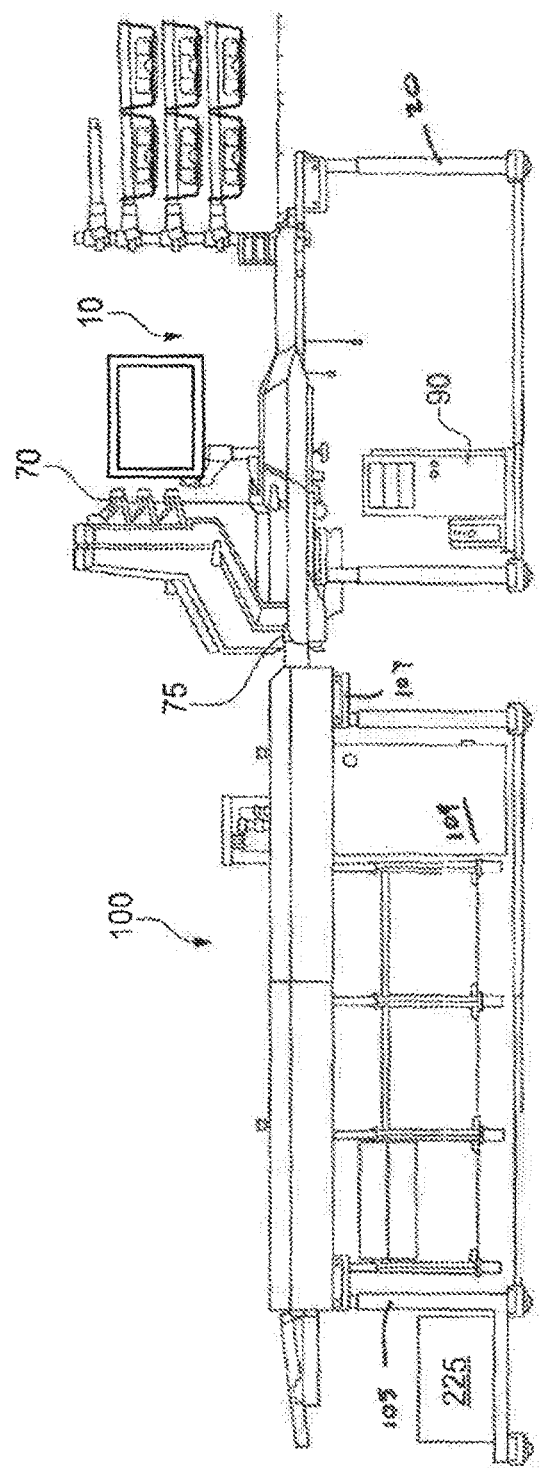
FIG. 3 is a side elevational view of the system illustrated in FIG. 1.

As shown in FIGS. 1 and 3, the workstation 10 includes a plurality of support legs 20 that elevate the work surface, including the drop conveyor 40 and the scanner 60. In the present instance, the support legs 20 are extendable legs so that the height of the workstation can be raised or lowered within a range depending on the height desired by the operator. Any of a variety of adjustment mechanisms can be utilized to raise or lower the support legs. Preferably the adjustment of the two legs is controlled so that both legs 20 raise and lower together. For instance, the adjustment mechanism may be interconnected with both legs so that both legs raise or lower together. In the present instance, the support legs 20 are telescoping legs and each leg includes a drive mechanism for raising and lowering each leg. The drive mechanism for the two legs 20 are synchronized so that the legs raise and lower together. The drive mechanism can be any of a variety of mechanisms, including, but not limited to hydraulic mechanisms and spindle drive mechanisms. Additionally, the drive mechanisms can comprise an electric pump, motor or manual drive element, such as a hand crank. If the drive mechanisms are automated, operation of the drive mechanisms may be controlled by an electronic controller, including a manually actuable switch. Alternatively, the controller may be interconnected with the central processor 90 of the workstation and actuation of the drive mechanisms may be controlled through an input mechanism such as the touch screen 80, a mouse, a button or other input element. In response to the input signal received from the operator, the central controller 90 may control operation of the drive mechanisms to raise or lower the legs 20.

At the scanner 60, each document is scanned to obtain optical image data for each document. After being scanned, the documents are then sorted to one of a plurality of output bins 70. Alternatively, after being scanned the documents are discharged to a bypass or through path 75. From the through path, the documents may be further processed as discussed further below.

The operation of the different stations is controlled by a central controller, such as a microprocessor 90. The central controller may also function as an image processor. Specifically, the microprocessor may be configured to process the image data obtained by the scanner. For instance, the image processor 90 may process the image data to attempt to identify and read text. Similarly, the image processor may attempt to identify and read a marking, such as a bar code. Additionally, the system may include an input/output device that provides information to the operator and allows the operator to input information regarding the documents being processed. For instance, the operator may input data that controls how a batch of documents are processed. Additionally, the operator may input information that controls how a particular document or packet of documents is processed. As shown in FIG. 1, the input/output device may be a touch screen display 80. Alternatively, the system may include any of a variety of input mechanisms, such as a mouse, touch pad, stylus or keyboard.

As described above, the system illustrated in FIG. 1 may be configured to process documents, such as envelopes containing contents. The details of an exemplary system that describes the details of the input bin 20, the envelope opening station 25 and the extraction station are described in detail in U.S. Pat. No. 8,919,084. The entire disclosure of U.S. Pat. No. 8,919,084 is hereby incorporated herein by reference. Additionally, the details of an exemplary drop conveyor 40, feeder 50 and scanner 60 are described in detail in U.S. Pub. Appl. No. 2015/0319330, filed May 15, 2015. The entire disclosure of U.S. Pub. Pat. Appl. No. 2015/0319330 is hereby incorporated herein by reference.

According to one aspect, the present system is directed to improving the flow of documents in a document processing system. The system has particular application to workstations directed to processing documents and has particular application to processing packets of documents. In an exemplary embodiment, the workstation is configured as a semiautomated system for processing documents of a variety of types, including documents of varying size as well as folded documents, such as documents extracted from envelopes. As described above, the system may be incorporated into a larger system that includes elements such as a cutting station for cutting open envelopes and an extraction station for opening the envelopes to present the documents to the user for extraction. However, it should be understood that the present system has application to systems that do not incorporate document extraction features but are instead directed to processing documents generally. For instance, features of the present system may be incorporated into a system that does not include extraction features, but includes the horizontal conveyor, scanning station and sorting station. Further still, features of the system may have application generally in a document processing system in which it is desirable to manually feed packets of documents into the system without organizing or otherwise preparing the packets for feeding into the system.

Document Scanning

With the foregoing in mind, a general overview of the flow of documents through the workstation 10 is as follows. Initially, one or more documents are provided for processing. For instance, a stack of envelopes containing documents, referred to as a job, is provided. To process the documents, the operator unfolds as needed and drops or places the documents onto a drop conveyor 40 that transports the documents toward a scanner or imaging station 60. An imaging entry feeder 50 receives the documents from the drop conveyor 40 and controls the feeding of the documents into the imaging station 60. The image entry feeder 50 is configured to receive and feed documents of various sizes and condition. For instance, frequently documents are folded in an envelope. When the documents are extracted and opened, the documents are creased or folded so that they do not lie flat. The feeder 50 is preferably configured to receive such creased or folded documents and serially feed the folded documents into the imaging station 60 with minimal manual preparation by the operator.

The imaging station 60 includes an imager that obtains image data for each document as the document is conveyed past the device. For instance, preferably the imager is a scanner that obtains gray scale or color image data representing an image of each document. The scanner scans each document at a plurality of points as the document is conveyed past the scanner. Data acquired by the scanner is then processed by one or more image processors. The image processors may be in the form of microprocessors on a separate imaging computer that is connected with the line scan camera. However, in the present instance, the image processor is an embedded processor in the line scan camera assembly. The image processor is operable to convert the image data to gray scale, such as 8-bit grey scale. Additionally, as discussed further below, the image processor is operable to binarize the gray scale image data to create a black and white representation of the document image.

By binarizing the data, the data for each pixel is converted from an eight-bit gray scale representation to a one bit black or white representation, which significantly reduces the processing required to make certain determinations for the document that may be used to control further processing as discussed further below. For instance, binarizing the image data highlights portions of the image that include text or other printed matter.

To binarize an image, the gray scale data for each pixel of the image is compared with a threshold. If the gray scale number for a pixel is above the threshold, the gray scale is converted to white. Conversely, if the gray scale number is below the threshold, the gray scale is converted to black.

To account for variations among the different documents being processed, an adaptive threshold may be used so that the binarization threshold is variable for each document. An adaptive threshold uses a different threshold for each document based upon a sampling of the image data for the document.

In addition to binarizing the image data, the image data may be filtered to reduce noise, which eliminates unnecessary background and stray marks from the document image. The noise filtering can be performed either in series or in parallel with the binarization.

The image data may then be stored in a short term or long-term storage device. For instance, the system may be connected with a network so that the document images may be exported and stored on a server 250, such as a file server. The server may be local, or it may be remote. As discussed above, the system may binarize the image data to create a black and white image. In the present instance, the binarized data is analyzed and used to control the further processing of the document. However, the binarized image data need not be stored on the file server. Instead, the grey-scale image data is stored on the image server.

From the imaging device, an imaging transport conveys the documents to a sorting station 70 that sorts the documents into a plurality of output bins. The documents can be sorted in a variety of ways. For instance, the documents can be sorted based on document information obtained from the image data received at the imaging station 60. Alternatively, the operator may indicate information regarding a document before it is scanned, so that the document is sorted according to the information indicated by the operator. Yet another alternative is that the documents may be stacked into one or more bins simply based on the order in which the documents are processed.

A controller 90 controls the processing of the mail in response to signals received from various sensors at various locations of the workstation 10 and in response to parameters set for the job by the operator.

Sorting Station

As noted above, documents may be processed by the workstation 10 by scanning and sorting the documents to output bins 70. Alternatively, documents may be scanned and directed to a bypass path 75. Referring to FIGS. 1-3, documents directed to the bypass path 75 are fed to a sorting station 100.

The sorter 100 includes an input conveyor 110 for receiving documents. The input conveyor conveys the documents to a printing station 130 that selectively prints indicia on the documents. From the printing station 130 the documents are conveyed to an output conveyor 150. A sorting station 160 sorts the documents to a plurality of output locations, such as output bins 220A-C. A reject bin 225 may also be provided for receiving items from the output conveyor 150.

Figure 4:
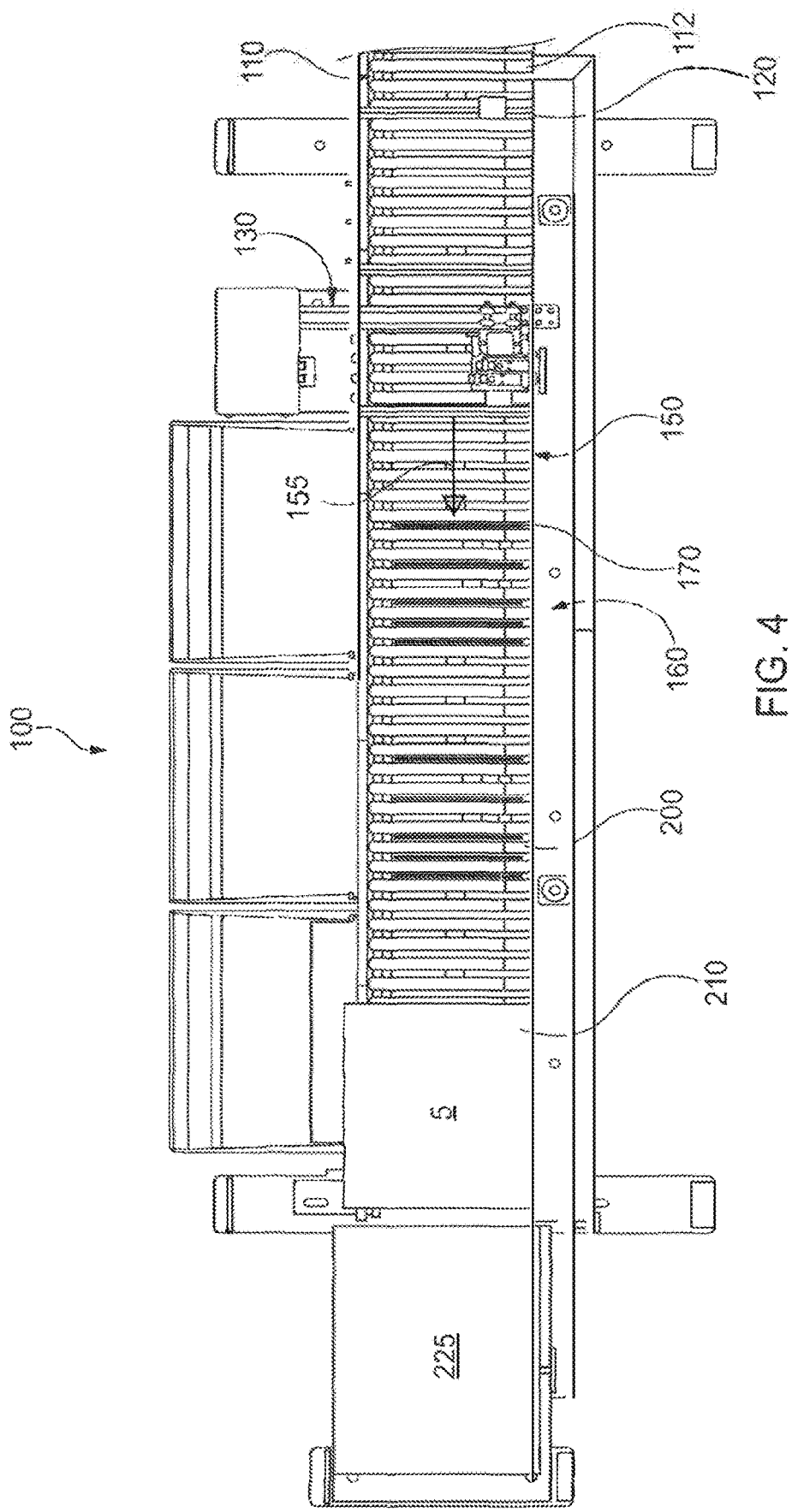
FIG. 4 is an enlarged fragmentary plan view of a sorter of the system illustrated in FIG. 1.

Referring to FIGS. 2-4 the details of the sorter 100 will be described in greater detail. The input conveyor 110 is configured to facilitate receiving documents from the bypass path 75. The input conveyor may comprise any of a number of mechanisms for conveying documents, such as belts or rollers. In the present instance, the input conveyor comprises a generally horizontal surface configured to receive documents in a horizontal orientation (i.e. a face of the document is generally horizontal). Additionally, the conveyor may be configured to convey the documents without positively entraining the documents. For example, the input conveyor may be a generally horizontal conveyor belt so that documents can be conveyed face down or face up on the belt. As illustrated in FIG. 3, the input conveyor 110 in the illustrated embodiment may optionally comprise a plurality of elongated rollers 112. The rollers may be rotatable around generally horizontal axes and may be driven by a drive element, such as one or more belts that rotate the rollers. Documents fed onto the input conveyor 110 may ride on top of the rollers 112.

The sorter 100 and the workstation 10 may be formed as a single rigidly interconnected unit. However, in the present instance, the sorter 100 is functionally interconnected with the workstation 10 while being moveable relative to the workstation. For instance, the system may include an optional bypass insert 120 disposed in the bypass path 75. The insert 120 provides a stop the impedes relative translation between the sorter and the workstation while allowing relative motion in one or more different directions as discussed below.

Figure 6A:
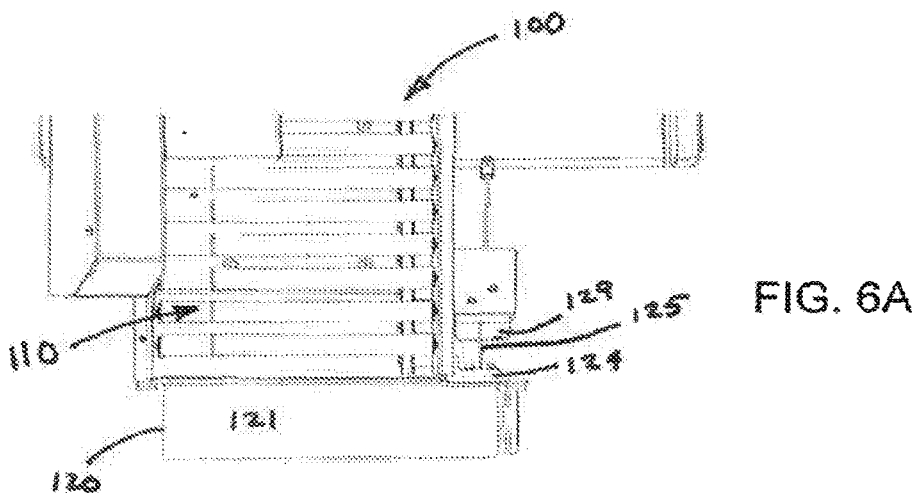
FIG. 6A is an enlarged fragmentary plan view of a portion of the sorter illustrated in FIG. 4.
Figure 6B:
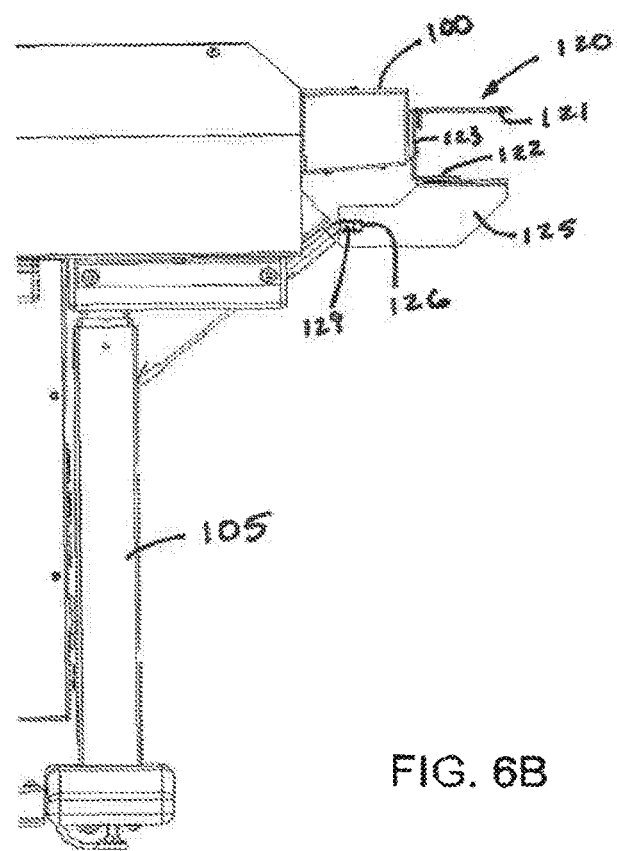
FIG. 6B is an enlarged fragmentary side elevational view of the portion of the sorter illustrated in FIG. 6A.
Figure 6C:
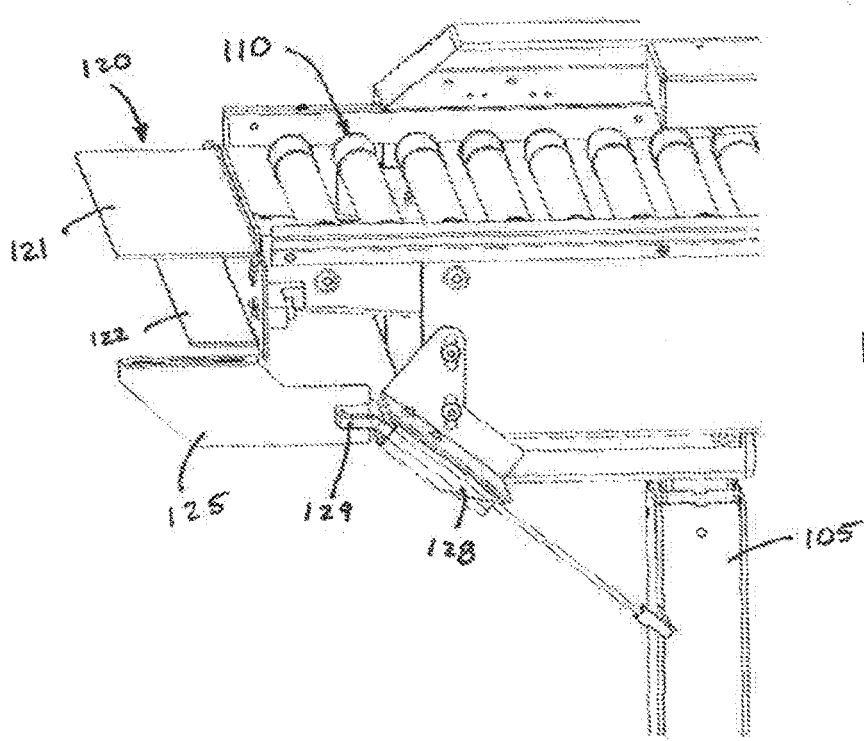
FIG. 6C is a fragmentary perspective view of the portion of the sorter illustrated in FIG. 6A.

Referring to FIGS. 6A-6D, the workstation includes a bypass path 75 that extends away from the scanner 60. The bypass path 75 allows documents to travel from the scanner 60 directly to the sorter 100. The end of the bypass path 75 remote from the scanner forms an enlarged opening having a height "h" and a depth "d" as shown in FIG. 6B. Documents conveyed through the bypass 75 exit through the discharge opening 77 onto the input conveyor 110 of the sorter.

The bypass insert 120 nests into the discharge opening 77. In particular, the bypass insert is a generally U-shaped channel having an upper leg 121 and a lower leg 122 connected by a central web 123. The upper leg 121 may be a generally horizontal planar surface extending transverse and intersecting with an upper edge of the web 123. Similarly, the lower leg 122 may be a generally horizontal planar surface extending generally parallel to the upper leg and extending transverse to and intersecting with the web 123. The insert 120 nests within the discharge opening 77 of the bypass path so that one or both of the upper and lower legs 122 abut a surface of the bypass path. With the insert 120 abutting a surface of the discharge opening 77 the surface of the discharge opening impedes further displacement of the insert toward the bypass path 75 and scanner 60. In this way, the vertical wall of the web 123 of the insert forms a longitudinal stop impeding relative movement of the sorter 100 in the direction of the document path toward the scanner. Specifically, from the perspective of FIG. 6B, the rightmost edge of the sorter forms a wall or edge that butts up against the web 123 of the insert. In this way, the sorter is not rigidly connected with the workstation so that the sorter can be displaced longitudinally away from the workstation along the direction of the document path, however, the insert operates as a stop impeding the sorter from being displaced longitudinally toward the workstation along the direction of the document path. Further still, the insert operates as a depth stop so that when the sorter abuts the insert, the distance from the scanner to the print station 130 is known.

Figure 6D:
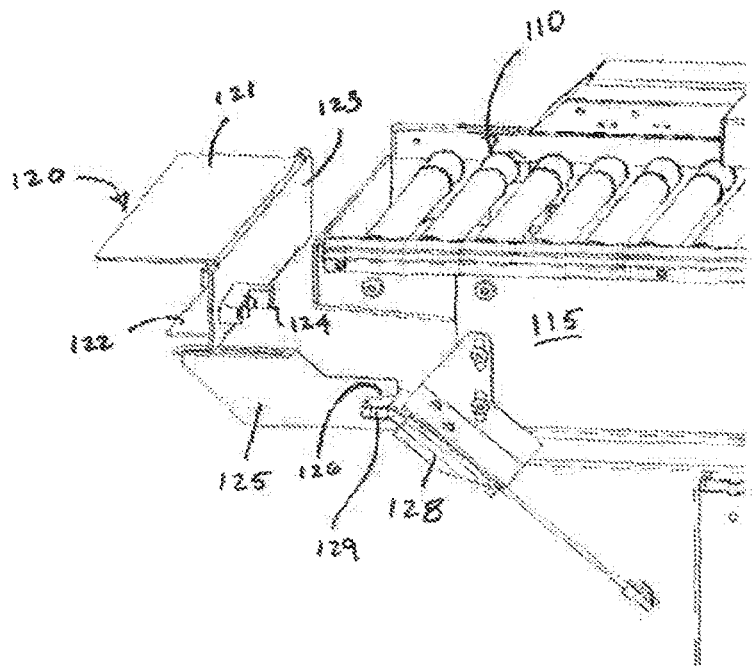
FIG. 6D is an exploded fragmentary perspective view of the portion of the sorter illustrated in FIG. 6C.

Referring to FIGS. 6A and 6D, the insert may include a lateral stop block 124 for impeding relative displacement between the sorter 100 and the workstation in a lateral direction that is transverse the document path. For instance, the lateral stop 124 may be a block rigidly connected with the web 123. The sorter 100 may have a rigid side wall 115 forming a back wall of the input conveyor 110. As shown in FIG. 6A, the stop block 124 abuts the side wall 115 when the end wall of the input conveyor 110 abuts the web 123 of the insert. Accordingly, the stop 124 impedes lateral displacement of the sorter relative to the workstation in a direction toward the back of the sorter (i.e. from left to right from the perspective of FIG. 6A), while still allowing the sorter to be displaced laterally in a direction toward the front of the sorter (i.e. from right to left from the perspective of FIG. 6A).

FIGS. 6A-6D also illustrate a non-rigid interconnection between a guide 125 rigidly connected with the workstation 10 and a sensor 128 rigidly connected with the sorter 100. The sensor 128 provides signals to a controller to control the height of the sorter 100 in response to the height of the workstation.

If the height of the input conveyor 110 is higher than the discharge path 75 the documents exiting through the discharge opening 77 will tend to butt up against the end of the sorter, thereby causing a jam. Similarly, if the height of the discharge opening 77 is significantly higher than the input conveyor 110 then the leading edge of documents may tend to fall into the gaps between the rollers 112 of the input conveyor. Accordingly, it is desirable to maintain the height of the input conveyor within a range relative to the height of the workstation.

Referring to FIG. 3, the sorter includes a plurality of legs 105 that support the sorter. Similar to the legs 20 of the workstation, the legs 105 are adjustable to raise or lower the height of the sorter. Like the legs of the workstation, the legs of the sorter may be any of a variety of adjustable legs, including but not limited to hydraulic legs and spindle drive legs. If the legs are functionally interconnected with workstation, then the sorter includes an electronically controllable drive mechanism 107 for automatically driving the legs 105 and a controller 109 for controlling the operation of the drive mechanism or drive mechanisms. For example, the sensor 128 may provide signals to the controller 109 and the controller may control the drive mechanism(s) 107 to raise and lower the height of the legs 105 in response to the signals received by the sensor 128.

Referring again to FIGS. 6A-6D, the sensor 128 is a switch having an actuator 129. A bracket connected to the input conveyor and the sensor 128 rigidly connects the sensor to the sorter 100. Additionally, a connecting bracket 125 is rigidly connected with the workstation 110. The connecting bracket 125 includes a notch 126 configured to receive the actuator 129 of the sensor. In this way, the actuator extends into engagement with the notch 126 in bracket 125. Therefore, when the legs of the workstation 10 are raised the bracket 125 is also raised. When the bracket 125 is displaced upwardly the movement displaces the sensor actuator 129 upwardly. In response to the actuation of the actuator upwardly the sensor 128 provides a first signal to the controller 109. In response to the first signal the controller controls the drive mechanism to raise the legs 105. As long as the workstation is being raised relative to the sorter, the connecting bracket 125 will actuate the actuator upwardly and the sensor will continue to send the first signal to the controller. Similarly, when the legs of the workstation 20 are lowered the connecting bracket will displace the actuator 129 downwardly. In response to the downward actuation of the actuator 129, the sensor will provide a second signal to the controller 109. In response to the second signal the controller controls the drive mechanism 107 to lower the legs. Again, the downward actuation of the actuator 129 will continue as long as the workstation is lower relative to the sorter.

In this way, as described above the sorter is functionally linked with the workstation without being fixedly linked with the workstation. Additionally, the functional link allows the sorter to automatically follow the height of the workstation when the workstation is adjusted so that the height of the sorter relative to the workstation is maintained within a predetermined range. Additionally, the functional link allows the sorter to follow the workstation without the need of an electronic connection between the controller controlling the height of the sorter legs 105 and the controller controlling the height of the workstation legs 20.

The input conveyor 110 conveys documents from the scanner 60 to the printer station 130. At the printer station 130 an identifying mark may be selectively applied to the document. For instance, the printer station 130 may apply a bar code or other identification mark on a document. The printer station 130 may also print human readable markings, such as text or graphics.

Print Station

The print station 130 includes one or more print heads 148. The printer may be any of a variety of print heads and in the present instance, the print head is a fixed print head 148. The system may control the actuation of the print head 148 to control the area on the document on which the print head prints. Specifically, the system may be configured so that the printer prints in a consistent location on each document. The controller that controls the print station can control the actuation of the print head to control the location where the printer prints along the length of the document. Specifically, a sensor may be positioned adjacent the print station to detect the leading edge of the document as the document enters the print station. Alternatively, the system tracks the document as it passes through the scanner 60. Based on the known distance from the scanner to the print head and the known speed of the document as it is conveyed to the print head from the scanner, the controller controls when the print head is actuated while the document passes under the print head. A shorter delay from when the lead edge of the document is detected will cause the printer to print closer to the leading edge of the document. A longer delay will cause the printer to print closer to the trailing edge.

Although the system may be configured to print in a consistent location, it may be desirable to selectively vary the location where the printer prints on the documents. For instance, as discussed below, the system may scan the document to identify an area free from text or graphics. The system may then control the print station to print the indicia in the desired location. Specifically, to control the area of printing the system may vary the timing of actuating the print head to control the area along the length of the document where the print head prints. In this way, the selective actuation of the print head may be based on identification of the desired print location for the document, detection of the leading edge of the document and the document speed as the document is conveyed past the print head.

Figure 7:
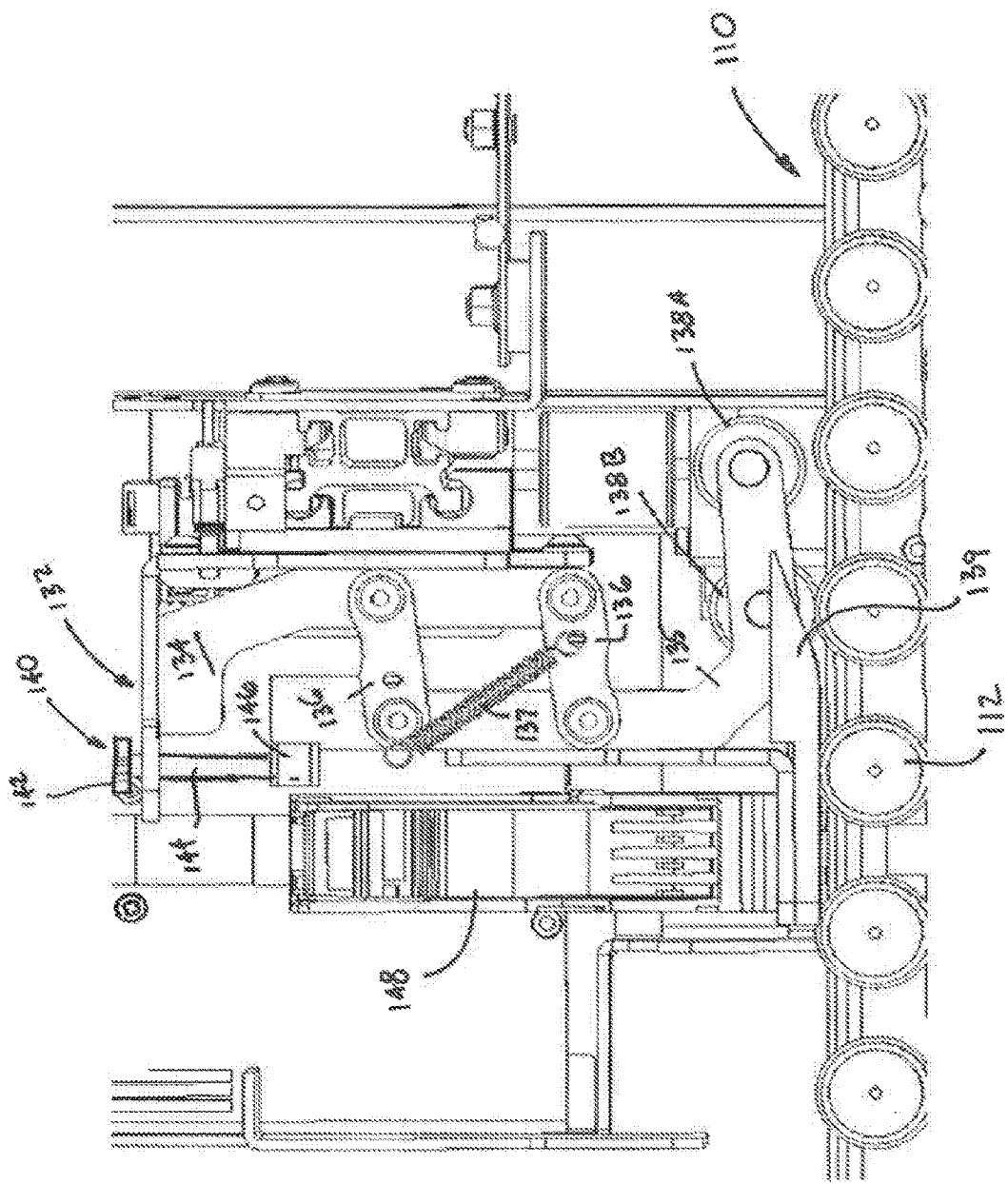
FIG. 7 is an enlarged side elevational view of a printing assembly of the system illustrated in FIG. 1.
Figure 8:
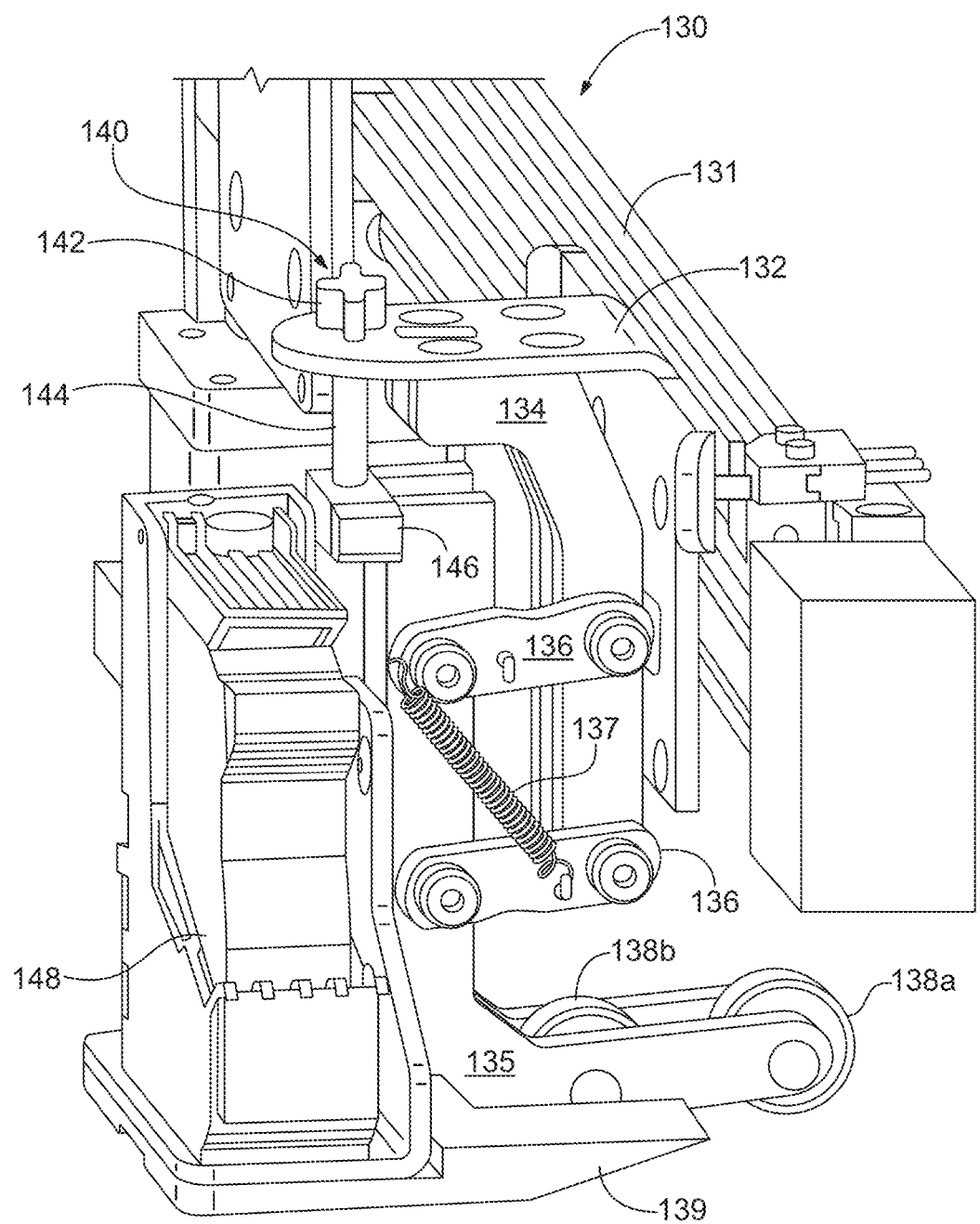
FIG. 8 is a perspective view of the printing assembly illustrated in FIG. 7.
Figure 9A:
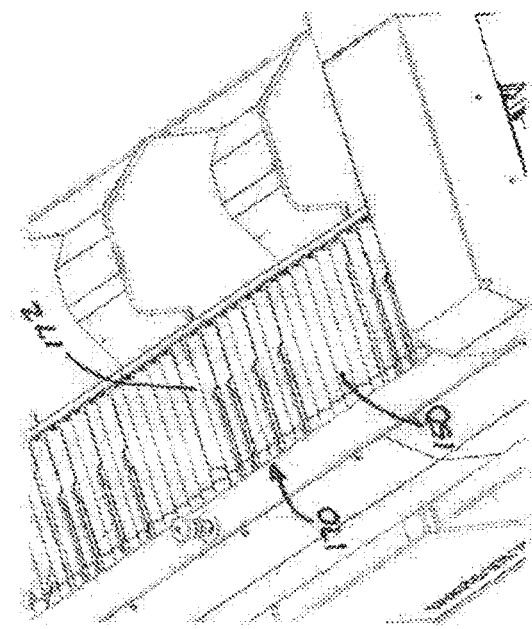
FIG. 9A is an enlarged fragmentary perspective view of sorting station of the sorter illustrated in FIG. 4, illustrating cross belt assemblies in a de-activated position.
Figure 9B:
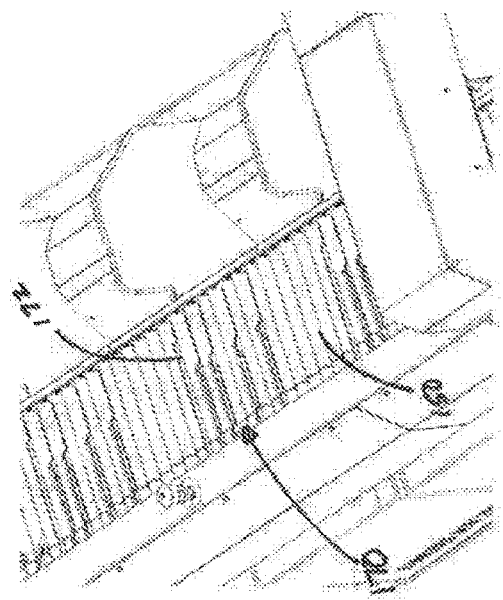
FIG. 9B is a perspective view of the sorting station illustrated in FIG. 9A, illustrating the cross-belt assemblies in a partially activated position.
Figure 9C:
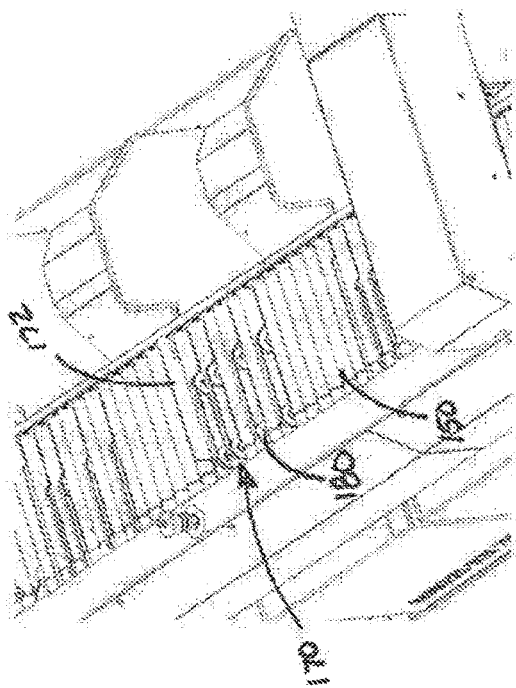
FIG. 9C is a perspective view of the sorting station illustrated in FIG. 9A, illustrating the cross-belt assemblies in an activated position.

The print station may also include elements for controlling the position of the print heads. Specifically, the print head 148 may be mounted on a carriage 132 that is moveable across the width of the document. Referring to FIGS. 7-8, the print station 130 may include a horizontal rail 131 that extends across the width of the conveyor 110. The rail 131 supports the carriage 132. In particular, the carriage slidably engages the rail so that the carriage is displaceable across the width of the conveyor.

In addition to moving the print head 148 in a horizontal direction, the print station 130 may be configured so that the print heads can be displaced in a vertical direction. For instance, a job may include the processing of courier packs, such as Federal Express mailers. Such documents are significantly thicker than documents such as normal piece of mail, such as a typical #10 envelope. Accordingly, print head 132 may move so that the distance between the document and the print head is consistent regardless of the document thickness.

FIGS. 7-8 illustrate an embodiment with an optional print station 130 that incorporates a carriage that includes a mechanism for varying the height of each document as the document is processed to promote a uniform distance between the face of each document and the print head 148. The print station optionally includes a print head 148 connected with the carriage by a four-bar linkage. The four-bar linkage is connected with a follower that engages each document as it is conveyed under the print head. The linkage includes a first generally vertical bar 134 that is substantially fixed during operation. The linkage includes a second generally vertical bar 135 connected with the print head 148 so that the second bar is constrained against movement relative to the print head. A pair of coupler links 136 interconnect the first and second bars. Since the coupler links 136 are pivotable connected with the first and second link, the second link 135 is vertically displaceable relative to the first link 134 during use.

The printer station 130 also includes one or more follower elements configured to engage the documents as the documents enter the print station. For instance, as shown in FIG. 8 a sled 139 may be connected to the bottom of the print head. The sled 139 is a generally horizontal plate or platen configured to ride on the top surface of a document as the document passes under the print head. Additionally, the print assembly may include one or more following elements upstream from the print head 148. For example, the second link 135 may be a generally L-shaped link having a generally horizontal leg. A pair of entry roller 138A, B may be rotatably connected with the second bar 135. The horizontal leg of bar 135 may be angled so that the first entry roller 135A is positioned vertically higher than the second entry roller. In this way, the gap between the circumferential surface of the input conveyor 110 is greater than the distance between the circumferential surface of the second entry roller 138B and the top surface of the input conveyor as shown in FIG. 7.

Configured in this way, as the conveyor 110 conveys a document to the print station 130, if the document is thicker than the distance between the entry roller 138A and the conveyor, the entry roller 138A will engage the top face or surface of the document and the document will push upwardly on the entry roller 138A. In response to the upward push by the document, link 135 will pivot upwardly relative to fixed link 134 that is fixed vertically relative to the overhead rail 131. As the document progresses the document will engage the second entry roller 138B. Since the gap between entry roller 138B and the conveyor 110 is less than the gap between the first entry roller 138A and the conveyor, the document will engage the second entry roller. As the document engages the second entry roller 138B the document will push upwardly on the entry roller. In response to the upward push, the second link 135 will be displaced upwardly further upwardly to allow the document to pass under the second entry roller 135B. As the document is conveyed under the second entry roller, the document passes between the sled 139 and the conveyor 110. Since the sled is rigidly connected with the second link 135, when the document passes under the sled the document will tend to push upwardly on the sled, which in turn drives the second link upwardly along with the print head 148. In this way, the sled 139 rides on the top surface of the document. Since the print head 148 is fixed relative to the sled, the distance from the print head to the surface of the sled in a known and fixed distance. Therefore, as the documents pass under the print head, the linkage of the print station allows the print head to be displaced vertically to position the print head at a uniform and consistent distance relative to the upper surface of the document.

The weight of the linkage and the sled pushing down on the document as the document passes under the print head 148 may create undue friction that could lead to the document buckling or crumpling. Accordingly, the print station 130 may include an element to reduce the force pushing the sled 139 downward during use. For instance, as shown in FIG. 7, a biasing element may be connected with one of the coupler links 136 or with the second link. The biasing element may be a spring or other element that pulls upwardly to reduce the downward force exerted on the sled by the weight of the linkage and the print head.

The carriage 132 may include a height adjustment assembly 140 for adjusting the gap between the sled 139 and the surface of the conveyor 110. The height adjustment assembly 140 includes an adjustment knob 142 connected with a threaded post 144 that engages a threaded insert 146. The threaded insert 146 is connected with the second link 135. In this way, rotating the knob 142 in a first direction operates to raise the second link 135, which in turn raises the sled 139 attached to the second link. Conversely, rotating the knob 142 in a second direction operates to lower the second link 135 which in turn lowers the sled 139.

Optionally, the print station can be configured so that the sled 139 and/or the second entry roller 138B cooperate with the top surface of the conveyor 110 to form a nip with the conveyor as shown in FIG. 7. In particular, the sled 139 in FIG. 7 is illustrated as resting on the rollers 112 of the conveyor 110. However, if the sled rests on the rollers then the sled is going to be vertically displaced every time a document passes under the print head 148. Accordingly, to minimize the vertical travel of the print head during use, the height of the sled may be adjusted for each batch of documents. For instance, a document from the batch, such as the thinnest document in the batch, can be selected to provide the height adjustment. The selected document is inserted between the sled and the conveyor. The height adjustment assembly 140 is then operated to lift the sled so that the sled is touching the document but placing minimal weight on the document. In this way, when documents that are as thick as the selected document pass through the printer station 130 the print head will be properly positioned vertically so that the print head will not need to be displaced vertically. When any document thicker than the select document passes through the print station 130 the document only displaces the print head by the difference between the select document and the document being processed. In this way, setting the gap between the conveyor and the print head is operable to reduce the extent of vertical movement of the print head.

Sorting Station

From the print station 130 the documents are conveyed along an output conveyor 150 to a sorter 160 that selectively sorts the documents to a plurality of output locations, such as receptacles 220A-C. Referring to FIGS. 4 and 9A-12 the details of the output conveyor 150 and sorter 160 are described in greater detail below.

The output conveyor 150 may comprise any of a number of conveyors, such as one or more conveyor belts, rollers or other elements. Optionally, as shown in FIGS. 9A-12, the output conveyor may comprise a plurality of horizontal rollers 152 similar to the rollers 112 described above in connection with the input conveyor 110. The rollers 152 are driven rollers so that the rollers convey the documents forwardly along the output conveyor. As with the input conveyor 110, the output conveyor 150 may be configured to convey the documents with the documents riding on top of the roller to that the documents are not positively gripped or entrained by the conveyor.

The output conveyor 150 includes a side wall 154 that extends along substantially the entire length of the output conveyor 150/sorter 160. The side wall 154 extends upwardly forming a stop preventing documents from falling off the side of the output conveyor 150/sorter 160. The rollers 152 may be skewed at an angle relative to the justification rail so that the rollers tend to drive the documents toward the side wall 154.

The sorter 160 is positioned along the output conveyor and is configured to selectively sort documents to a plurality of sort locations 220 based on any of a variety of criteria. For instance, the criteria may be determined during processing at the scanning station 60 or the sort criteria may be based on criteria such as the detected thickness, detected length or other criteria.

The sorter 160 may comprise any of a variety of structures adapted to selectively direct documents from a first path to a second path directed toward an alternate output location. In particular, the output conveyor 150 may convey the documents along a document path indicated as arrow 155 in FIG. 4. In the present instance, the sorter 160 optionally includes one or more discharge assemblies 170, 200, 210 that drive the documents traverse the document path 155 toward one of the output areas 220A-C (discharge assembly 210 is hidden below mail piece 5 in FIG. 2).

The sorter 100 includes a discharge assembly for each sort location 220. The discharge assembly is configured to selectively drive a document off the output conveyor 150 and into one of the sort locations in response to a control signal. In the present instance, the sorter 160 includes three separate discharge assemblies 170, 200, 210. The three separate assemblies are independently actuable and all three are configured substantially similarly.

Referring to FIGS. 4 and 9A-12, the details of the first discharge assembly 170 will now be described in greater detail. It should be understood that the description of the first discharge assembly applies equally to the second and third discharge assemblies 200, 210.

The first discharge assembly 170 is an assembly that is recessed between the rollers 152 in the output conveyor 150. The discharge assembly 170 has various elements that are actuable between two positions. The first position is a recessed or deactivated position, the second position is a raised or activated position. In the recessed position, documents on the output conveyor pass over the discharge assembly. In the raised position, select elements of the discharge assembly raise up above the top surface of the output conveyor to engage the document and drive the document toward the sort location.

The discharge assembly includes two elements: a fence 172 for stopping the forward progress of the document and a plurality of cross belt assemblies 180 for driving the document across the document path 155 to the output or sort area. Additionally, the discharge assembly may include three drive controls: a first drive control for raising the fence 172, a second drive control for raising the cross-belt assemblies 180 and a third drive control for driving the cross-belt assemblies 180 to convey the document to the discharge area.

The fence 172 is configured to engage documents on the output conveyor and impede forward displacement along the document path 155. The fence may be configured in any of a variety of forms to stop documents. In the present instance, the fence 172 is a substantially planar wall having a width that extends across the width of the output conveyor and a height that extends upwardly from the surface of the output conveyor. In the present instance, the fence has a width that is substantially greater than its height. Additionally, the fence 172 has a width that extends across a substantial portion of the width of the output conveyor to ensure that the documents engage the fence when the fence is raised. The height of the fence may vary depending upon the application. In the present instance, the fence is approximately ½"-3" high.

Figure 10:
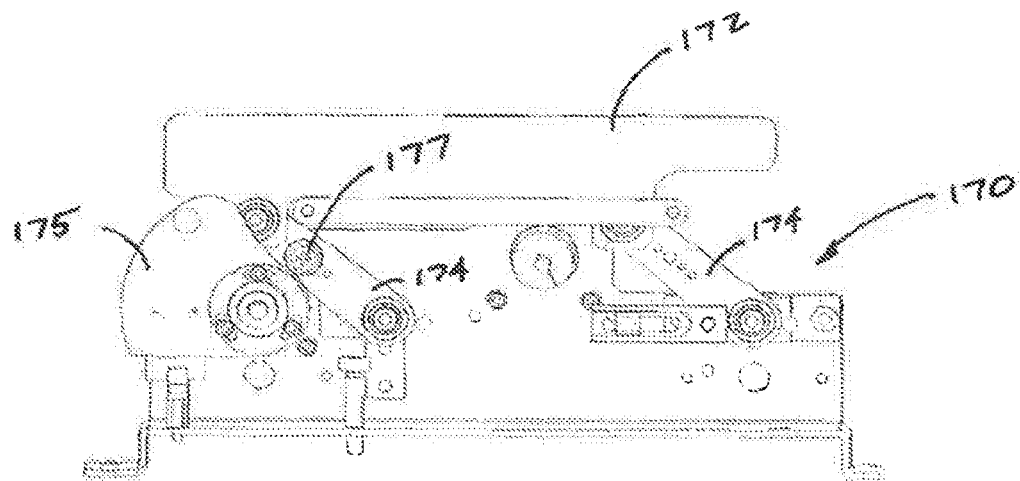
FIG. 10 is a fragmentary end view of a portion of one of the cross-belt assemblies illustrated in FIGS. 9A-C.

Referring to FIG. 10, the fence 172 is connected with a linkage configured to raise and lower the fence. Any of a variety of mechanism can be utilized to raise and lower the fence. In the present instance, an option in disclosed in which the fence 172 is connected with two pivot arms 174 to form a four-bar linkage and an actuator actuates operation of the four bar link. For example, a rotary cam may be provided to actuate and de-actuate the fence. A follower 177 may be connected to one of the pivot arms 174 of the fence linkage. The follower 177 may be any of a variety of fixed or moveable followers. In the present instance, the follower is a cam follower bearing. The follower 177 cooperates with an eccentric radial cam 175, such as a wedge cam as shown in FIG. 10. The follower 177 engages the peripheral surface of the cam 175 so that when the cam is rotated clockwise (from the perspective of FIG. 10) the cam drives the linkage clockwise thereby raising the fence 172. Additionally, the linkage is biased toward the deactivated or recessed position. Therefore, when the cam is rotated back into the start position as shown in FIG. 10, the pivot arms 174 pivot into the recessed or deactivated position to lower the fence 172.

In the embodiment illustrated in the drawings and described above, each discharge assembly includes four separate cross belt assemblies. However, it should be understood that the discharge assemblies may be configured with fewer cross-belt assemblies or more cross belt assemblies.

Since the discharge assembly 170 includes a plurality of cross belt assemblies, when a document is to be discharged by the discharge assembly, all the cross-belt assemblies 180 may be raised and actuated to drive the document across the conveyor and into the sort location 220. Accordingly, the following description describes the structure of one of the cross-drive assemblies 180, but it should be understood that all of the cross-drive assemblies are configured the same or essentially the same as the assembly 180 described below.

The discharge assembly 170 may utilize a variety of elements to selectively control the raising and lowering of each cross-belt assembly. In the present instance, the cross-belt assemblies 180 each includes a four-bar linkage for controlling the raising and lowering of each belt. The linkage includes a pair of pivot arms 185 that are connected by a coupler link 186. An idler pulley 183 is rotatably connected to the end of each pivot arm 185 and an endless belt is entrained around the two idler pulleys. The belts 182 also passes around driven pulley 184 as shown in FIG. 11A.

A cam controls the activation of the pivot arms 185. In the present instance, the cam 188 is an eccentric radial cam. The belt assembly linkage includes a follower that cooperates with the cam 188 to raise and lower the belts. As shown in FIG. 11A, one of the pivot arms 185A includes an extension that protrudes from the main body of the pivot arm. A follower 187 is connected to the distal end of the protrusion. The follower may be any of a variety of followers. In the present instance, the follower is a cam follower bearing. The cam 188 is an eccentric radial cam that pivots about an axis. Additionally, the control linkage may include a biasing element for biasing the belt 182 toward the retracted position. For example, as shown in FIG. 11C, a spring 189 biases the second pivot arm 185B toward the retracted position.

Figure 11A:
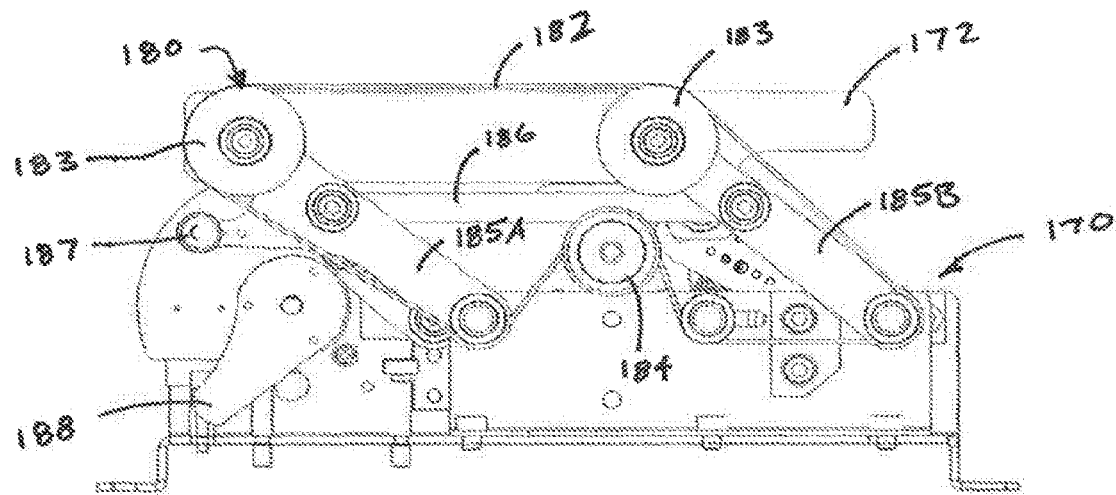
FIG. 11A is a fragmentary end view of a portion of one of the cross-belt assemblies illustrated in FIGS. 9A-C, showing the cross-belt assembly in the de-activated position.
Figure 12:
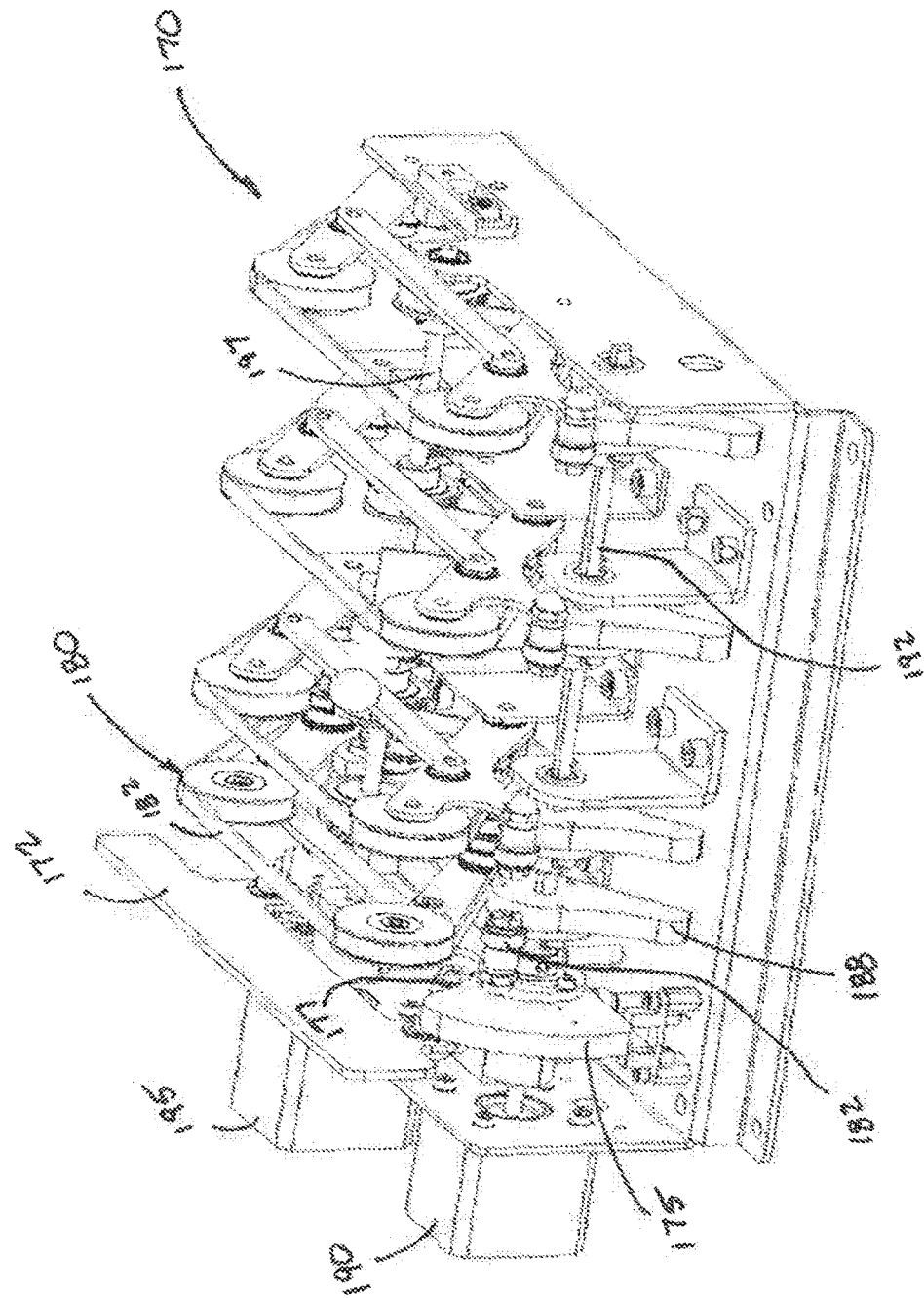
FIG. 12 is a perspective view of the cross-belt assembly illustrated in FIGS. 11A-C.

Referring now to FIG. 12, a pair of motors control the operation of the cross-drive assembly 180. The first is a motor 190 for driving the cams 175, 188 that control actuation of the fences and the belts. The cam motor 190 drives a cam drive shaft 192. Each cam 175, 188 in a cross-drive assembly 170 is mounted on the cam drive shaft 192. For example, the cross-drive assembly illustrated in FIG. 12 includes four belt assemblies 180 and one fence assembly. Therefore, one fence cam 175 and four belt cams 188 are mounted on the cam drive shaft 192. Additionally, the cams 175, 188 are configured and oriented so that rotation of the shaft first actuates the fence 172 and then after a delay, continued rotation of the shaft 192 actuates the belts. Specifically, from the recessed position shown in FIG. 12, actuating the cam motor drives the shaft 192 in a first direction. As the shaft rotates in the first direction the cam follower 177 on the fence linkage 174 follows the periphery of the fence cam 175 thereby pivoting the fence toward the raised position. However, as shown in FIG. 11A prior to actuation of the cam drive shaft, the follower 187 on the belt linkage 185 is spaced apart from the cam 188. Therefore, while the first rotation of the shaft 192 drives the fence cam 175 against the follower 177, the belt cam 188 rotates from being spaced apart from the belt follower 187 to being in engagement with the follower. After the fence is raised, continued rotation of the shaft 192 drives the belt cam 188 against the followers to drive the belt linkage, thereby raising the belt 182.

Figure 11B:
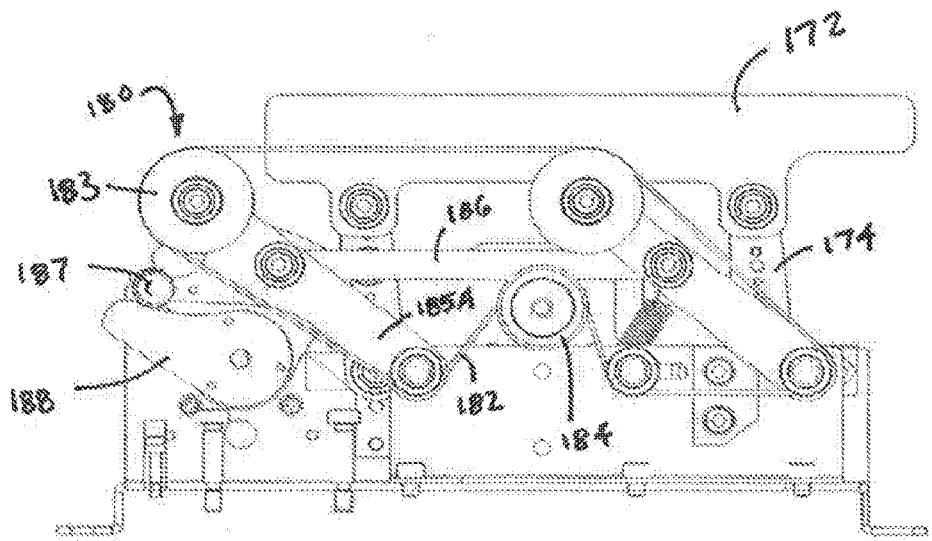
FIG. 11B is fragmentary end view of the cross-belt assembly illustrated in FIG. 11A, showing the cross-belt assembly in the partially activated position.
Figure 11C:
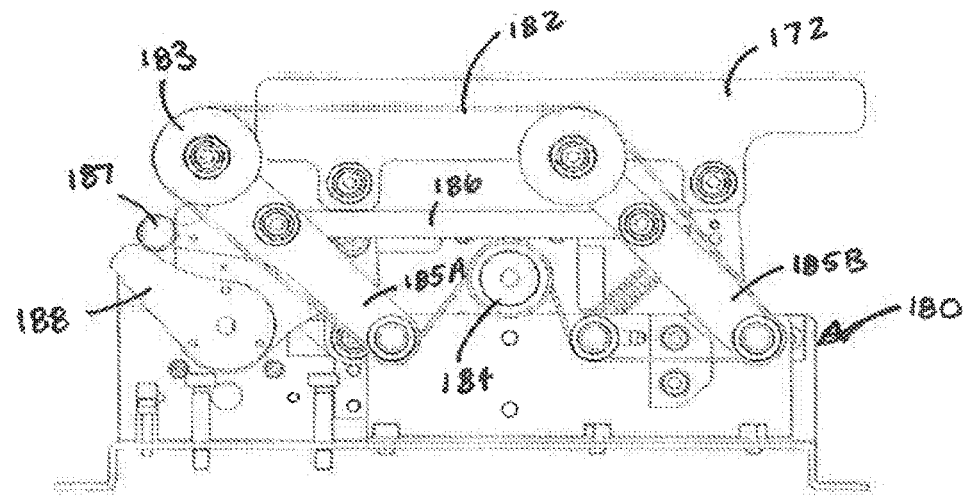
FIG. 11C is a fragmentary end view of the cross-belt assembly illustrated in FIG. 11A, showing the cross-belt assembly in the activated position.

In other words, referring to FIG. 11A, the cam drive shaft 192 is in a first position in which the fence 172 and the belts 182 are recessed within the rollers of the conveyor. In this first position, the fence cam 175 engages the cam follower 177, but the belt cam 188 is spaced apart from the belt follower 187. Actuating the cam drive motor 190 drives shaft 192 in a first direction by a first angular amount. As the shaft 192 is rotated by the first angular amount, the cam 188 drives follower 187 thereby raising the fence. When the shaft 192 is driven by the first angular amount, the belt cam 188 rotates from a first angular position in which the cam is spaced apart from the follower 187 to a second position in which the cam engages the follower but does not actuate the follower as shown in FIG. 11B. From the second position, the motor 90 drives the shaft a second angular amount, thereby rotating the fence cam 175 and the belt cam 188 a second angular amount. The fence cam is configured so that continued rotation by the second angular amount does not significantly displace the fence linkage further. However, the continued rotation of the belt cam 188 by the second angular amount actuates the belt linkage driving the belt 182 into the raised position as shown in FIG. 11C.

The belt assembly also includes a drive motor 195 that drives a shaft 197 connected with each driven pulley 184 of each belt assembly 180. Accordingly, driving motor 195 drives each driven pulley, which in turn drives each belt 182 to drive a document from the output conveyor 150 to one of the sort locations 220.

Sort Receptacles.

Figure 13:
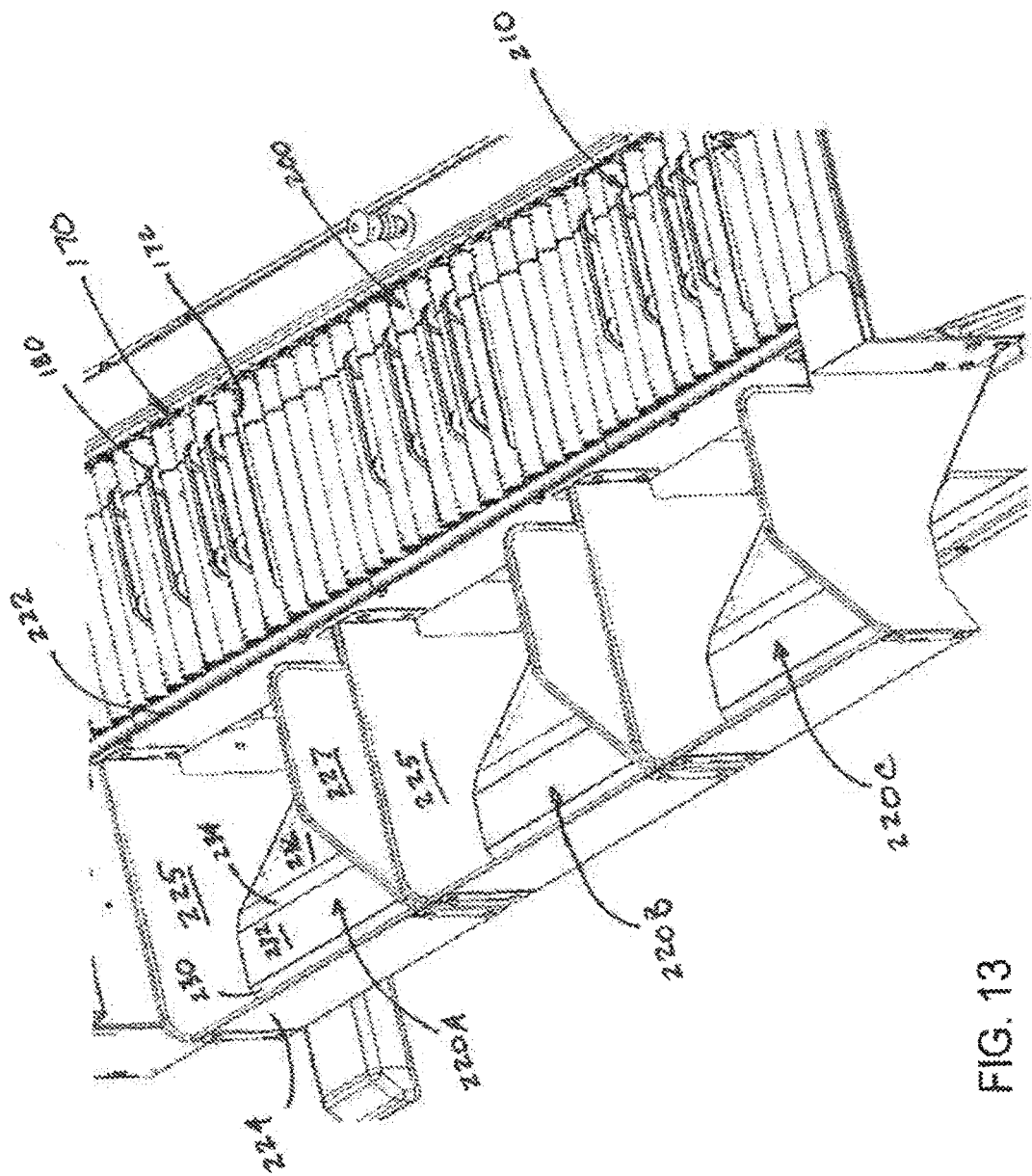
FIG. 13 is an enlarged perspective view of sort locations of the sorter illustrated in FIG. 4.
Figure 14:
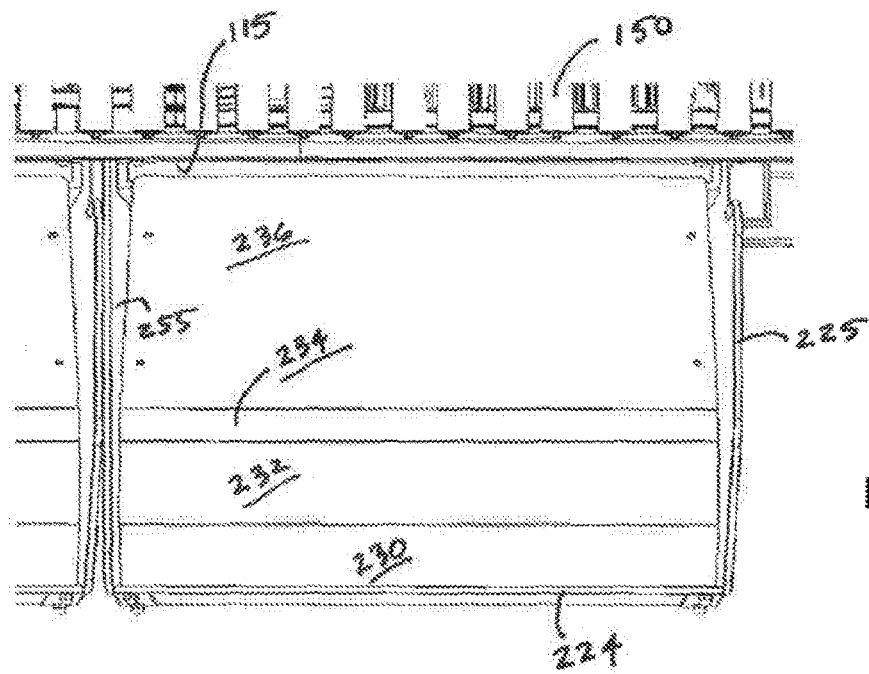
FIG. 14 is an enlarged plan view of one of the sort locations illustrated in FIG. 13.
Figure 15:
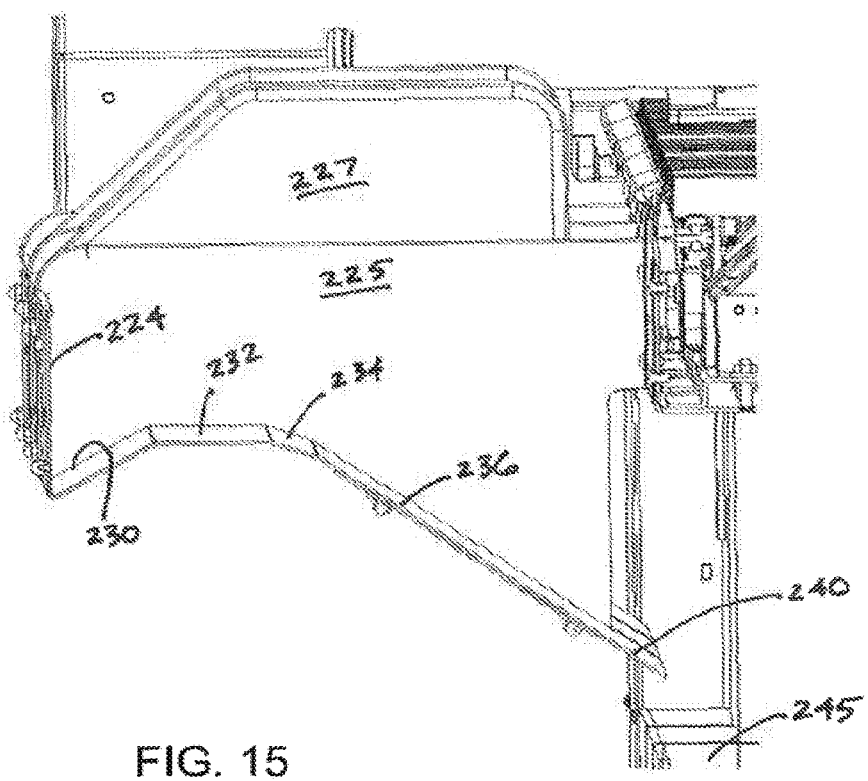
FIG. 15 is a cross-sectional view of the sort location illustrated in FIG. 14 taken along line 15-15.

As discussed above, the sort station 160 selectively directs documents to sort locations 220. The number and configuration of the sort locations may vary depending on the application. For instance, the sort locations may be bins positioned next to the conveyor 150. Alternatively, as shown in FIGS. 13-15 the sort locations may comprise receptacles configured to facilitate self-clearing so that the documents do not build up and create a jam. In an exemplary embodiment, the system includes three receptacles 220A-C configured to direct documents to sort bins 245 below the conveyor 150.

Since the system processes mixed batches of documents of varying shapes and sizes it is possible for the intermixed documents to get caught up or jammed between the conveyor 150 and the bottom of the receptacle 220. For instance, long mail pieces (e.g. pieces that are nearly as long as the width of the conveyor belt) may be discharged in a manner that the leading edge of the document butts against a bottom surface of the receptacle while the trailing edge of the document remains on the edge of the conveyor 150 or leans against the edge 115 of the sorter. In such a situation, the document can create a bridge extending between the receptacle 220 and the conveyor 150 which create a backup or jam for subsequent documents. Further still, the conveyor 150 and the cross-belt assemblies 180 do not positively entrain the documents. Instead, the documents ride on top of the conveyor 150 and cross belt assemblies. Therefore, potential slippage between the conveyor 150 or the cross-belt assemblies limits the force that can reasonably be applied to the documents to discharge the documents into the receptacles. Accordingly, in some applications it may be desirable to provide a receptacle 220 that is configured to promote the flow of documents into the bottom of the receptacle.

Referring to FIGS. 13-15 an optional self-clearing receptacle 220 is illustrated. The receptacle is configured to clear documents sorted into the receptacle without need for operator intervention. The illustrated embodiment includes three receptacles 220A-C, but it should be understood that each receptacle is substantially similar. Therefore, the following discussion applies equally to each of the receptacles.

Each receptacle 220 includes a front edge 222 at the edge of the conveyor and a back wall 224 opposing the front edge. The back wall may be substantially parallel with the font edge 222. a pair of spaced apart sidewalls 225 extend between the front edge 22 and the back wall 224. The side walls 225 may be substantially parallel to form a generally rectilinearly shaped receptacle. The receptacle may be configured to operate as a bin, however, in the present instance the receptacle 220 is configured to direct documents through an opening 240 in the bottom of the receptacle. Documents pass through the opening 240 and into a storage container, such as a bin 245. In this way, the receptacle may operate as a chute or guide for guiding/directing documents from the conveyor to the appropriate bin 245.

The interior surfaces of the receptacle 220 are configured to facilitate the passage of a variety of document configurations through the receptacle and into the bin 245. Specifically, the interior surface of the receptacle is a multi-faceted interior. The bottom of the receptacle 220 is configured to direct documents downwardly toward the discharge opening 240 and into the bin 245. The bottom includes a plurality of sections. A first facet 230 comprises a generally planar wall intersecting a lower edge of the back wall. The first facet angles upwardly forming an acute angle with the lower edge of the back wall. In this way, the first facet 230 has a first edge that intersects the back wall and a second edge that is elevated above the first edge thereby forming a V-shaped pocket.

A second facet 232 of the bottom of the receptacle is a generally or substantially horizontal ledge or shelf. The ledge 232 has a first edge that intersects the second edge of the first facet 230. The ledge 232 also has a second edge that may be substantially parallel to the first edge to form a horizontal shelf.

A third facet 234 of the interior has a first edge that intersects the second edge of the ledge 232. From the intersection with the ledge, the third facet slopes downwardly at an acute angle relative to the horizon so that the second edge of the third facet is vertically below the first edge that intersects the ledge. A fourth facet 236 has a first edge that intersects the second edge of the third facet. From the intersection with the third facet, the fourth facet slopes downwardly away from the third facet at an acute angle relative to the horizon. The angle that the fourth facet forms with the horizon is greater than the angle that the third facet forms with the horizon so that the fourth facet slopes at a steeper rate. The fourth facet 236 is substantially deeper than the first three facets. Additionally, the fourth facet provides a ramp to direct documents toward the bin 245 below the receptacle 220.

As shown in FIG. 14, each of the facets extends substantially the entire length of the receptacle, wherein the length is the dimension extending from the right-side wall 225 to the left side wall 225. Further, the width of each facet may be different. For instance, as shown in FIG. 14, the width of the receptacle extends from the edge 115 of the conveyor 150 to the back wall 224. The width of the receptacle is preferably similar to the width of the conveyor 150. For instance, the width of the conveyor 150 (i.e. as measured along the axis of rotation of the rollers 152) is approximately 12 inches. The width of the receptacle 220 is greater than 10 inches and may be less than 15 inches. In the embodiment illustrated in FIGS. 13-15 the width of the receptacle is approximately 12.5 inches. The fourth facet has a width that is significantly larger than any of the first three facets. For instance, the width of the fourth facet 236 may be approximately half the width of the conveyor. Additionally, the first facet is narrower than the second facet and the third facet is narrower than both the first and second facets.

Configured as described above, the receptacle has a multi-faceted interior that progressively angles away from the conveyor. In other words, in the direction of travel of the documents that are ejected from the conveyor 150 to the receptacle 220, the first facet along the direction of travel is the fourth facet 236, which faces toward the direction of travel at the most acute angle. The next facet along the direction of travel is the third facet 234, which faces toward the direction of travel at a shallower angle that the fourth facet. The next facet along the direction of travel is the second facet 232, which is general horizontal so that it is generally parallel to the direction of travel. Finally, the final facet is the first facet 230, which faces away from the direction of travel.

The length of each facet is selected to improve the likelihood that a document will move down the receptacle toward the bin 245 under the influence of gravity without getting caught on the surface of the conveyor 150 or the side 115 of the conveyor. For instance, long documents will tend to pass over the ledge 232 so that the leading edge of the document either impacts the back wall 244 or drops into the pocket formed between the back wall 224 and the first facet 230. Such a long document will be long enough that the center of gravity of the document is positioned over the third facet 234 so that the document will tend to slide down the fourth facet 236 into the bin 245. Conversely, if the document is relatively short the leading edge may tend to strike the third facet 234. Due to the shallow angle that the third facet forms with the horizon, the document will resist forming a bridge between conveyor and the third facet. Instead the document will tend to pass over the third facet and then slide down the fourth facet toward the bin 245. In yet another example, if a long document slips on the belt assembly so that the belt does not provide much force driving the document into the receptacle 220, the leading edge of the document may fall down and impact the angled fourth facet 236. In such a scenario, the trailing edge of the document may extend upwardly and form a bridge with the edge 222 or 115. However, the trailing edge is also likely to extend above the height of the conveyor surface. Therefore, a subsequent document conveyed to the receptacle is likely to drive the trailing edge of the document over, flipping the document in the receptacle so that it slides down the bottom into the bin 245. From these examples, it can be seen that the configuration of the interior of the receptacle tends to promote sorting of the documents to the bins 245 without causing jams or backups.

Reject Bin

Figure 5:
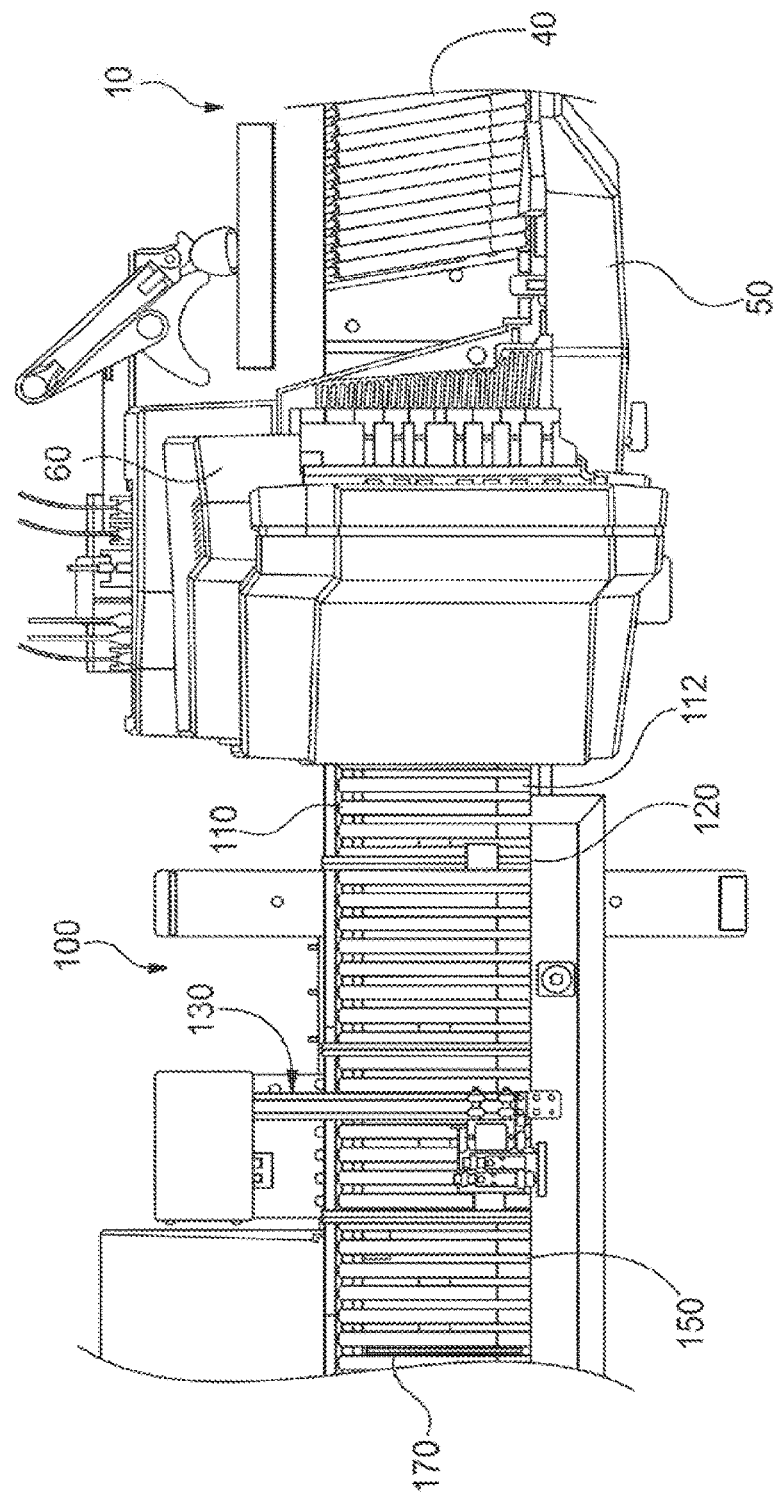
FIG. 5 is a fragmentary plan view of the system illustrated in FIG. 1.

As shown in FIGS. 2,4 and 5, a reject bin may be positioned at the end of the horizontal ledge 232 of the output conveyor 150. Documents that are not sorted by the sorter 160 to one of the receptacles 220A-C are discharge to the reject bin. In this way, the reject bin 225 operates as a separate sort location. Accordingly, the reject bin may be utilized as a fourth sort location so that the documents may be sorted to one of the four sort locations based on criteria detected during processing of the documents.

Figure 16A:
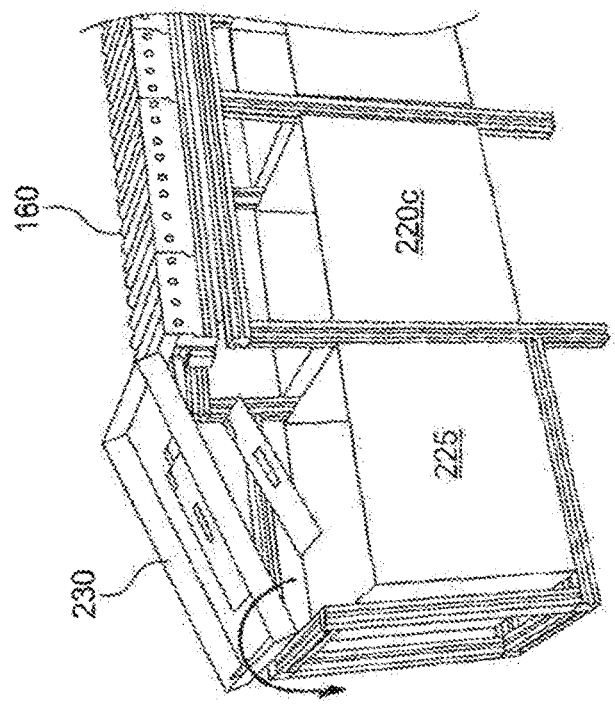
FIG. 16A is a perspective view of an end of the sorting station illustrated in FIG. 4, with a sort tray illustrated in a lower position.
Figure 16B:
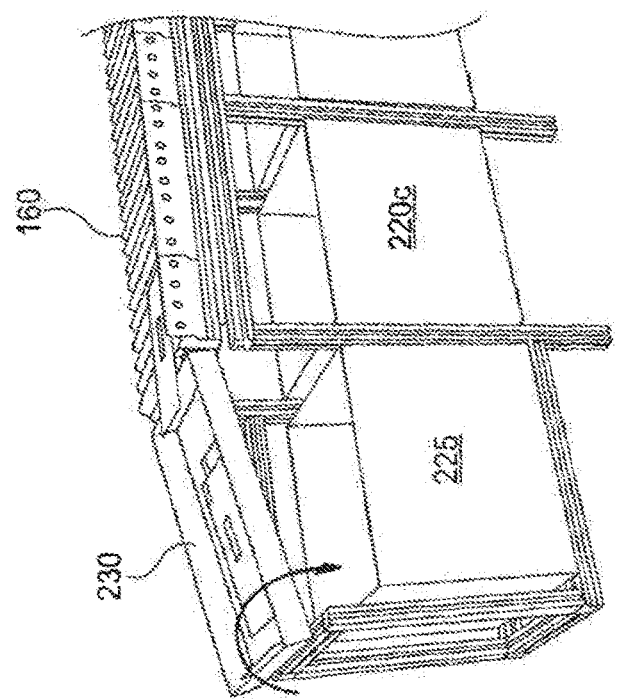
FIG. 16B is a perspective view of the sorting station illustrated in FIG. 4, with the sort tray illustrated in an upper position.

In the previous discussion, the bin at the end of the conveyor is described as a bin 225 that either receives rejected pieces or operates as a fourth sort location. Alternatively, the end of the output conveyor 150 may be configured to include a low volume tray 230 and a high-volume sort bin that is similar to sort bins 220A-C. Specifically, referring to FIGS. 16A, 16B, the low volume sort tray 230 overlies the bin 225. The tray is a shallow tray that is pivotable between an upper position and a lower position. Referring to FIG. 16A, the forward end of the tray 230 is open so that when the tray is pivoted into a downward position the forward edge of the tray is below the upper surface of the output conveyor 160 so that document discharging off the end of the output conveyor fall into the tray. However, as shown in FIG. 16B, when the tray 230 is pivoted into an upper position the forward edge of the tray is spaced above the upper surface of the output conveyor 160. In this way, when the tray 230 is in the upper position a gap is formed between the tray 230 and the output conveyor. Documents being discharged from the end of the conveyor fall through the gap and into the large bin 225. The controller controls the operation of the tray to pivot the tray between the upper and lower positions to selectively direct document to either the bin 225 or the tray 230.

Method of Use

The workstation 10 and sorting station 100 may be utilized to process a variety of documents using a variety of document workflows. The workstation 10 and the sorting station combine to provide alternate workflows that can be utilized for different batches of documents. For instance, a first batch of documents may be a stack of documents in the form of contents that have been extracted from envelopes. For such a job, the operator may input information to the system indicating that the documents for that job are to be scanned by the scanner 60 and sorted to the output bins 70. Alternatively, the operator may input information indicating that the documents in a job are to be processed by the sorting station 100. For such a job, the operator drops each document onto the drop conveyor 40 and the system then conveys each piece to the feeder 50, which feeds the piece to the scanner 60 and discharges the piece through the bypass path 75 to the input conveyor 110 of the sorting station 100.

One method of use sorts the documents based on instructions received on a piece by piece determination. However, the instructions are not provided in real time. Instead, each piece is scanned and the image for the piece is exported to a file server so that the images for the piece can be accessed by a remote user. The user examines the images and provides processing instructions for the different pieces. The pieces are processed during a second pass and each piece is sorted in response to the instructions received for the piece.

For example, a job may include numerous documents in the form of mail pieces, such as envelopes containing contents. The recipient of the mail pieces may desire different mail pieces to be processed differently depending on different criteria. For instance, the recipient may want certain pieces to be discarded, such as junk mail. The recipient may desire a second type of mail piece to be extracted and scanned to obtain image data for the enclosed documents. The original documents can then be discarded without being delivered to the recipient. The recipient may desire a third type of mail to extracted scanned to obtain image data for the enclosed document. For this third type of mail, the recipient desires to also receive the original documents. For a fourth type of mail, the recipient may desire the mail to be delivered without being opened. As can be seen from the foregoing, by identifying how the mail is to be processed, a significant portion of the mail may be able to be processed without the need to be physically delivered to the recipient. Although this can significantly reduce the amount of mail to be delivered, it may require the recipient to identify how each piece of mail is to be processed. To do so, the system may scan each piece during a first pass to obtain image data for each mail piece. The image data for each mail piece is exported to a remote server to await instructions from the recipient. For instance, the system may be configured so that when the recipient views the image for a piece of mail the system prompts the recipient to identify how the mail piece is to be processed (e.g. which of the four mail types is the piece). During a subsequent pass through the sorter, the pieces are sorted according to the instructions received for each piece.

In order to correlate the document images with the actual mail piece it is desirable to identify each mail piece with a unique identification element, such as a number bar code or other marking. When the recipient views the images for a piece, the instructions received for the piece will be correlated with the unique identifier for the piece. In this way, during a subsequent pass the unique identification element can be scanned and then processed in accordance with the instructions received for that identification number.

In view of the foregoing, a method of using the system to process mail may operate as follows. The operator inputs information into the system using the control panel 80 to indicate that the job includes a number of documents to be processed by the sorting station 100. The operator then drops each piece onto the drop conveyor 40. The pieces are conveyed to the feeder 50 which feeds the pieces to the scanner 60 which scans the documents to obtain high resolution image data for each document. The image data is exported to a file server or other remote storage to allow the recipient remote access to the stored image data.

It should be understood that the image processor 90 for the system is operable to process the image data acquired for a document by the scanner 60. In particular, the image processor is operable to process the data to identify and read markings on the document. For instance, the image processor 90 may utilize OCR to identify text, such as the recipients address printed on the document. Similarly, the image processor may identify and read markings such as a bar code. For instance, during a second pass the image processor 90 may scan the image data for a document to identify the identification marking printed on the document by the printing station 130 during the first pass. The identification marking can then be used to control the processing of the document in the sorting station 100 as discussed further below.

From the scanner 60 the piece pieces are conveyed through the bypass path to the input conveyor 110 of the sorting station. The image data obtained by the scanner 60 may be processed to identify a clear area on the piece where an identification marking can be printed. The image processor may be configured to analyze the image data to identify an area sufficiently clear of marking or printing so that a unique identification marking can be applied to the piece. Although a separate imaging station may be provided, it should be understood that the system may operate without a separate imaging station. Instead, as noted above, the image data for a document may be obtained by the scanner 60 and the image processor 90 may process the image data during the first pass and during subsequent passes as well. Accordingly, it should be understood that any section of this description that details the processing of the image data may be performed by the image processor 90 associated with scanner 60.

From the scanner 60, the conveyor 110 conveys the piece to the printing station 130. The imaging station then prints the unique identification marking on the piece in the location where the imaging processor detected a clear zone. Specifically, as described previously, the printing station can control the area on which the marking is printed by controlling the timing of the printing as the document is conveyed past the print head. Additionally, the print head may be moved across the width of the document in response to the identification of the area where the marking is to be printed.

After the identification mark is printed on the piece, the piece exits the printing station and is conveyed to one of the discharge areas. During this first pass all the pieces can be sorted to a single output area. After the recipient views the images for the scanned pieces and provides instructions, the pieces are processed during a second pass. Specifically, the operator inputs information into the system via the control panel indicating that the job includes a number of pieces to be processed during a second pass. The pieces are dropped on the drop conveyor 40 and conveyed through scanner 60 where the scanner obtain image data for each document and then discharges the documents through the bypass path 75 to the sorting station 100. The system then analyzes the image data for a document to search for and read the identification marking. In the present instance, the system imaging processor 90 may process the image data obtained by the scanner 60 during the second pass to attempt to locate and read the identification mark printed on the document by the printing station during the first pass. When the identification number is determined, the instructions received for the piece are retrieved. The sorter then sorts the piece to one of the sort locations 220A-C based on the instructions received for the piece. However, some of the pieces may not have been viewed by the recipient so the recipient may not have provided instructions for some pieces. Accordingly, pieces for which instructions have not yet been provided are sorted together in one of the sort locations. Alternatively, such pieces may all be discharged to the reject bin 225. The pieces for which instructions had not been received may be processed again at a later time according to a subsequent processing pass that is similar to the second pass described above. This process is repeated until all the pieces in the job are sorted according to the recipient's instructions. However, it may be desirable to limit the number of times that a piece is processed or the time frame for receiving instructions from the recipient. For instance, after five days, pieces for which instructions have not been received are automatically processed as mail to be delivered to the recipient without being opened.

In the foregoing description, the method included the step of analyzing the image data for a piece to identify a clear zone in the form of an area sufficiently free of marking so that an identification marking can be printed on the piece so that the marking can later be scanned. It may be desirable to print the identification in certain areas of the piece. However, it is desirable to identify clear zones if the desired area is not clear. Accordingly, it may be desirable to scan for the clear zone in a manner that prioritizes certain areas of the document. For instance, the system may process the image data to identify blocks of image data that are free from marking. Such blocks may be clear zones. If a clear zone has an area that is larger than the size of the identification marking, then the clear zone may be a candidate zone for printing the identification marking. However, the document may include more than one candidate clear zones so that the system may select from among the candidate zones to determine the print zone as discussed further below.

One such method of scanning for clear zone includes the following steps. First, the piece is scanned to obtain optical image data for a document, such as a mail piece. Specifically, the image data includes image data in three color spaces: red, green and blue. Therefore, each pixel has a red value, a green value and a blue value. The image data for a document is converted to 8-bit gray scale so that each pixel represents a light intensity between 0-255. In order to reduce processing requirements, it may be desirable to select one of the color spaces and convert the image to gray scale using just the single-color space. For instance, rather than using all three-color spaces, the green color space may be selected. The light intensity of each pixel in the green space is converted to a gray scale light intensity. However, in the present instance it may be desirable to separately combine each color space to create the gray scale image. In particular, the image data is processed on a pixel by pixel basis. For each pixel, the corresponding blue value is added to the corresponding red value and the corresponding green value. The combined light intensity for all three-color spaces is then divided by three to provide the corresponding gray scale light intensity from 0-255. The image processor may then process the image data by binarizing the data as described previously above. The image data for the image may then be separated into a plurality of subsets and each subset may be analyzed. For instance, the image data for a piece may be separated into a plurality of separate segments, each represent a portion of the document. By way of example, the document may be divided into a grid or array of blocks. The image data for the document is segmented into a series of data subsets, each corresponding to one of the blocks in the grid. The image processor analyzes the data in each subset to identify the number of black pixels in the subset. If the number of black pixels in below a threshold, the subset or block is identified as a clear zone. The image processor then analyzes the next subset of image data to determine whether the number of black pixels in the subset is below the number of black pixels in the previously processed subset of image data. If the number of black pixels in the subset is lower than the number of black pixels in the previous subset, then the number of black pixels in the current subset becomes the threshold. Each subset is analyzed in this way and compared against the detected black pixel threshold. When a subsequent subset has a black pixel count below the threshold, the subset is determined to be the clear zone. By analyzing the data in stepwise fashion this way, the number of black pixels in the clear zone will continue to reduce until a subset has zero black pixels or until the clearest area is processed.

The system may also operate so that a subset is identified as the clear zone (i.e. the area where the identification mark is to be printed) if the subset has a count of black pixels that is within a threshold amount of black pixels of the previously determined clear zone. For instance, if the threshold is 10 and a subsequent subset is determined to have 8 more black pixels than the current threshold value, then the subset being processed is identified as a clear zone and the subsequent subset is compared to the number of black pixels in the clear zone.

By way of example, the image data for a piece may be segmented into a series of 54 subsets of data, representing a grid of 6 rows and 9 columns of image data blocks. The clear zone threshold may be initially set at a threshold indicative of the minimum amount a marking that will qualify as a clear zone area. For instance, the clear zone threshold may be initially set at 100. Subset 1 is analyzed, and the number of black pixels is identified. For instance, the number of black pixels may equal 75. Therefore, the clear zone threshold is set at 75. The second subset is examined, and the number of black pixels is 90. The threshold remains set at 75 and the third subset is examined. The third subset is examined, and the number of black pixels is 40. Therefore, the third subset is identified as the clear zone and the threshold is set to 40. The fourth subset is examined, and the number of black pixels is also 40. The threshold remains at 40, but subset four is identified as the clear zone. In this way, the methodology weights or prioritizes blocks or data subsets that area processed later.

As described above, the methodology may be used to prioritize or weight the subsets that are processed later. Therefore, certain areas of the documents can be prioritized for clear zones by controlling the order in which the areas of the image data are processed. For example, returning to the example in which the document is segmented into a grid of 54 blocks and the image data is segment into subsets corresponding to such blocks. The data may be analyzed in an order starting with one of the blocks in the middle of the grid, such as row 3, column 3. The segments may be processed in an order that corresponds to moving in a counterclockwise rotation from the original block. In this way, the last blocks to be processed are the blocks corresponding to the trailing edge of the piece and the upper edge of the piece. By analyzing the data in this order, the process prioritizes or weights the trailing edge and the upper edge for the clear zone. Alternatively, the system may prioritize certain areas of the document, such as the upper edge or lower edge. The data may be processed so that the systems factors in the location of the clear zone and not just the size of the clear zone. For instance, the system may process the data and identify several portions of the document each of which has a clear zone having an area that is greater than the area required to print the necessary identification marking. Each such clear zone is a candidate clear zone because it has sufficient length and width on which to print the identification marking, such as a bar code. The system may select which clear zone is the zone on which the identification marking is printed (i.e. which candidate zone is the printing zone). For instance, the printing zone need not be the candidate zone with the largest area. Instead, the printing zone may be selected according to a second criteria. For instance, it may be desirable to weight the printing zone toward being in a particular portion of the document. One example may be to weight the printing zone so that the printing zone is toward the bottom of the document. In this way, the candidate zone that is farthest toward the bottom of the document is selected as the print zone. Similarly, it may be desirable to have the print zone toward the leading edge of the document. In such an instance, the system will select the candidate zone closest to the leading edge as the print zone. Further, other criteria can be used to select the print zone from among a plurality of candidate zones. For instance, the print head is moveable, but it may be desirable to minimize movement of the print head. Therefore, it may be desirable to select the print zone so that movement of the print head is minimized. Accordingly, from a plurality of candidate zones the system may select as the print zone the zone that is most closely aligned with the print head.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

The invention claimed is:

1. An apparatus for processing documents, comprising:
   a conveyor for receiving documents, wherein the conveyor is configured to convey documents along a document path without entraining the documents;
   a plurality of output locations configured to receive documents from the conveyor;
   a sorter for sorting documents to the output locations, wherein the sorter comprises:
   a first set of ejectors configured to displace documents on the conveyor transverse the document path, wherein ejectors in the first set of ejectors are positioned to eject documents toward a first one of the output locations;
   a displaceable stop operable to selectively stop documents along the document path;
   a first rotatable cam;
   a second rotatable cam;
   a first cam follower connected with the displaceable stop such that rotation of the first cam operates to raise the ejector;
   a second cam follower connected with one of the ejectors such that rotation of the second cam operates to raise the ejector;
   a shaft connected with the first and second cams so that the shaft is operable to rotate the first and second cams, wherein the first cam is configured and positioned on the shaft such that rotation of the shaft by a first angular amount raises the stop without raising the ejector and wherein rotation of the shaft by a second amount raises the ejector.

2. The apparatus of claim 1 wherein the displaceable stop is displaceable between a first position in which the stop is positioned below an upper surface of the conveyor and a second position in which the stop is positioned above the upper surface.

3. The apparatus of claim 2 wherein the displaceable stop is positioned adjacent the first set of ejectors.

4. The apparatus of claim 1 wherein each of the ejectors of the first set of ejectors comprises a belt assembly operable to engage documents.

5. The apparatus of claim 1 comprising a second set of ejectors configured similar to the first set of ejectors, wherein the second set of ejectors is spaced from the first set of ejectors and wherein each ejector in the second set of ejectors is configured to displace documents toward a second one of the output bins.

6. The apparatus of claim 5 wherein the controller is configured to selectively operate the first or second set of ejectors to direct documents to the first or second output bin based on criteria other than the detected characteristic that is indicative of the length of the document.

* * * * *